US005586841A

United States Patent [19]
Anderson et al.

[11] Patent Number: 5,586,841
[45] Date of Patent: Dec. 24, 1996

[54] DUAL PURPOSE MODULAR BLOCK FOR CONSTRUCTION OF RETAINING WALLS

[75] Inventors: Peter L. Anderson, North Reading, Mass.; Michael J. Cowell, Leesburg; Dan J. Hotek, Chantilly, both of Va.

[73] Assignee: Societe Civile des Brevets Henri Vidal, France

[21] Appl. No.: 382,985

[22] Filed: Feb. 3, 1995

Related U.S. Application Data

[63] Continuation-in-part of Ser. No. 137,585, Oct. 15, 1993, Pat. No. 5,474,405, and a continuation-in-part of Ser. No. 108,933, Aug. 18, 1993, Pat. No. 5,487,623, which is a continuation-in-part of Ser. No. 40,904, Mar. 31, 1993, Pat. No. 5,507,599.

[51] Int. Cl.$^6$ ............................................. E02D 29/02
[52] U.S. Cl. ............................................. 405/286; 52/606
[58] Field of Search ........................... 405/284, 285, 405/286; 52/562, 606

[56] References Cited

U.S. PATENT DOCUMENTS

| | | | |
|---|---|---|---|
| 5,161,918 | 11/1992 | Hodel | 405/286 |
| 5,163,261 | 11/1992 | O'Neill | 405/286 X |
| 5,257,880 | 11/1993 | Janopaul, Jr. | 405/284 |
| 5,259,704 | 11/1993 | Orgorchock | 405/286 X |
| 5,350,256 | 9/1994 | Hammer | 405/286 |

*Primary Examiner*—William P. Neuder
*Attorney, Agent, or Firm*—Banner & Allegretti, Ltd.

[57] ABSTRACT

A modular block wall includes dry cast, unreinforced modular wall blocks with anchor type, or frictional type or composite type soil stabilizing elements recessed therein and attached thereto by vertical rods which also connect the blocks together. The soil stabilizing elements are positioned in counterbores or slots in the blocks and project into the compacted soil behind the courses of modular wall blocks. The soil stabilizing elements may also comprise hollow core precast blocks connected to the facing blocks.

30 Claims, 19 Drawing Sheets

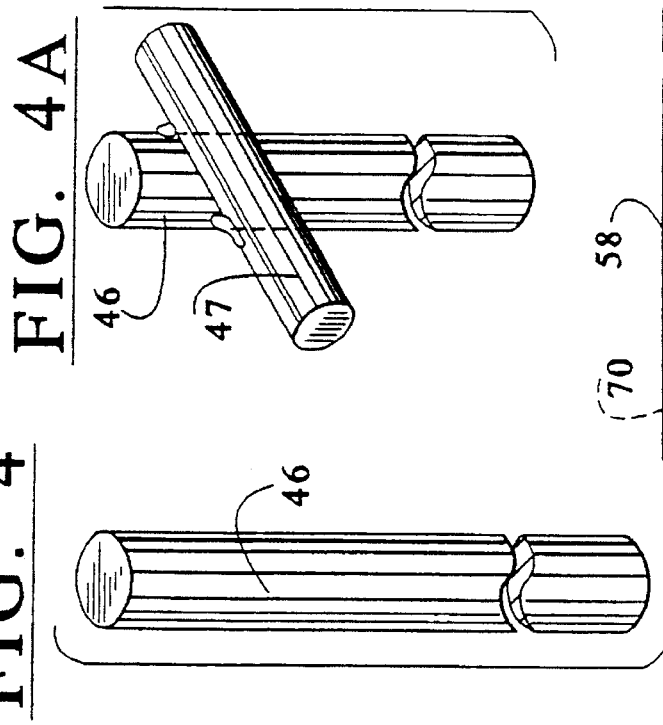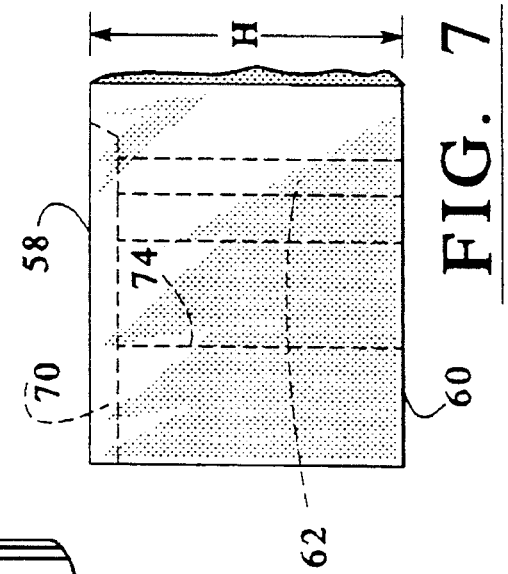

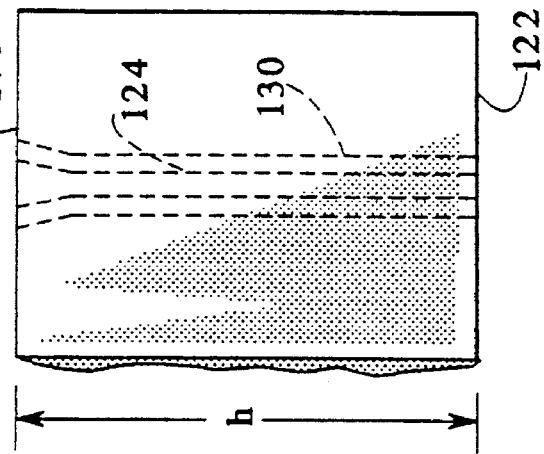
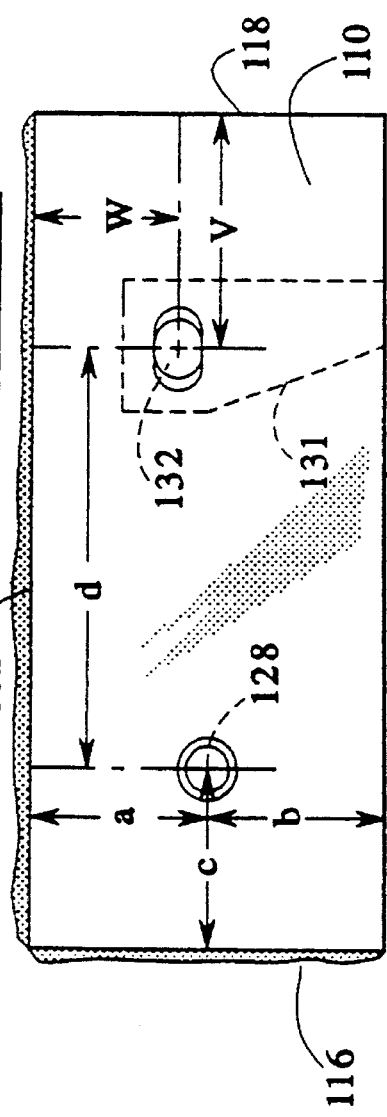
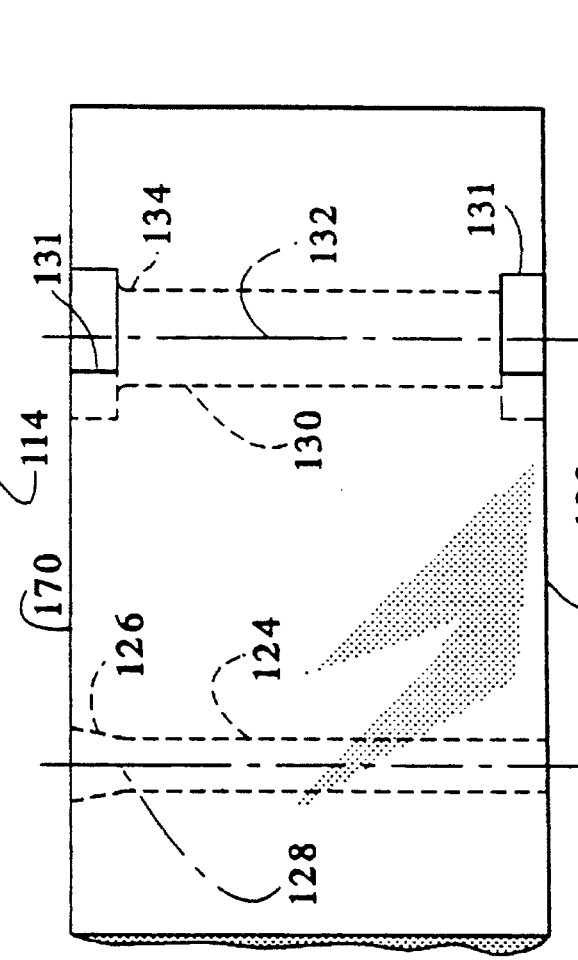

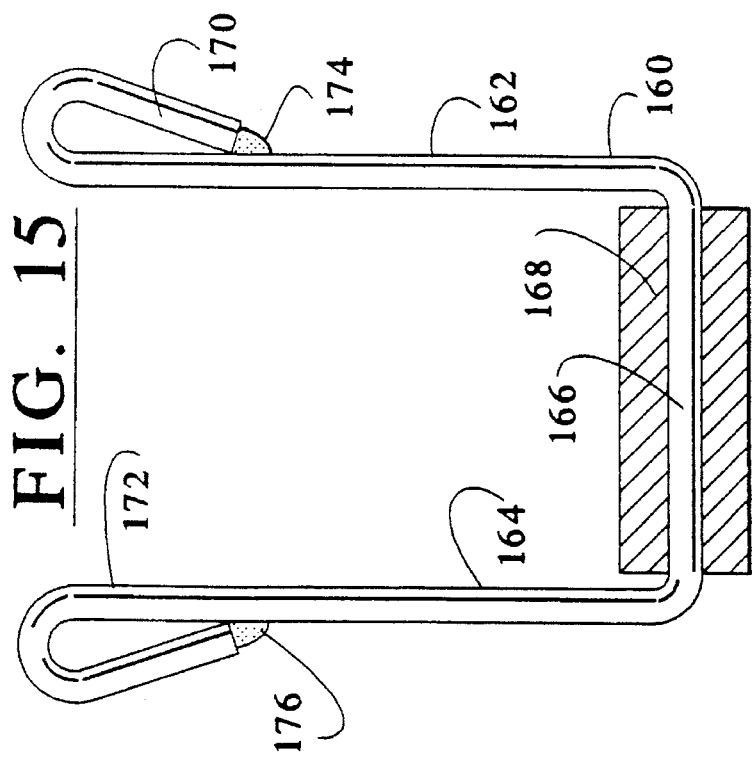
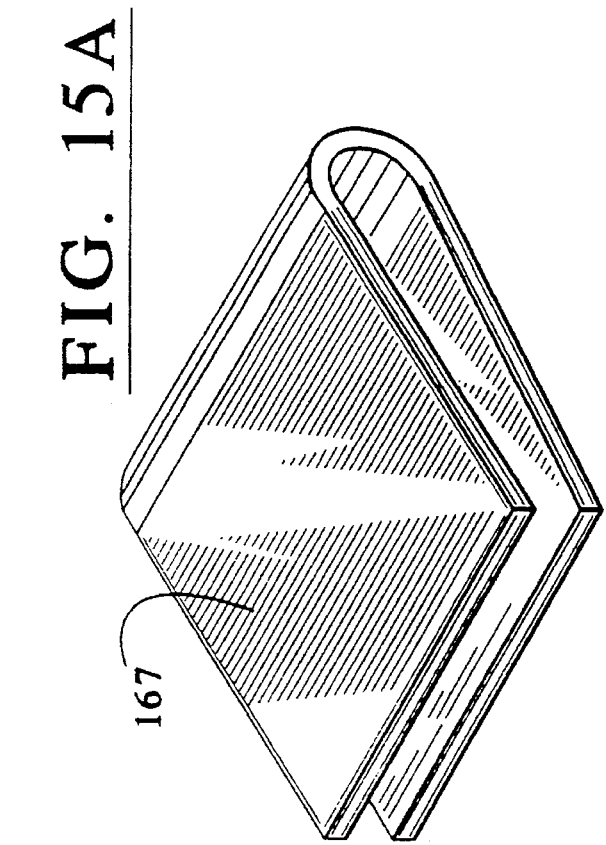
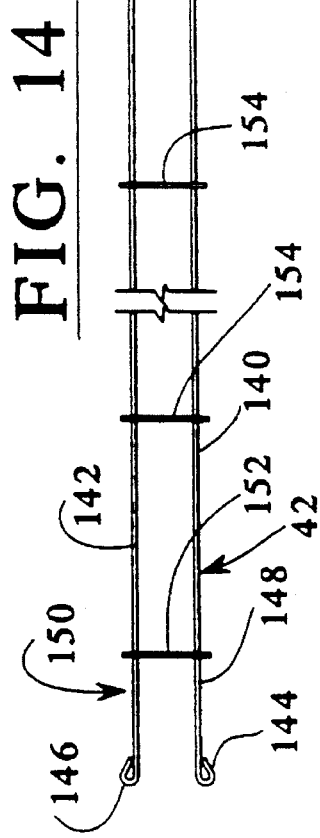

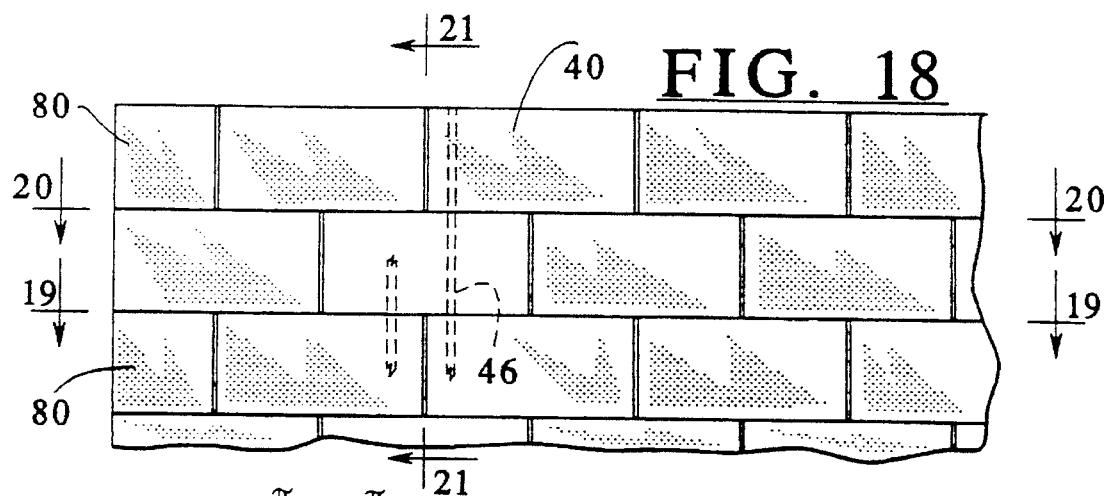
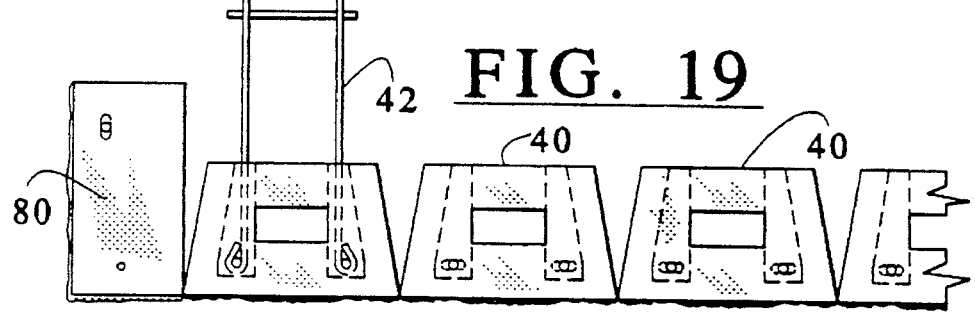
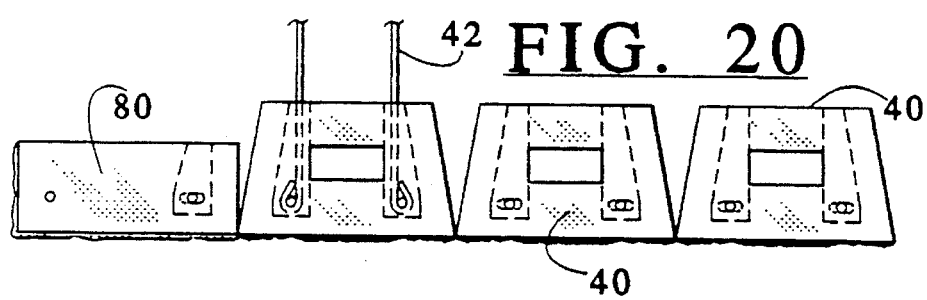
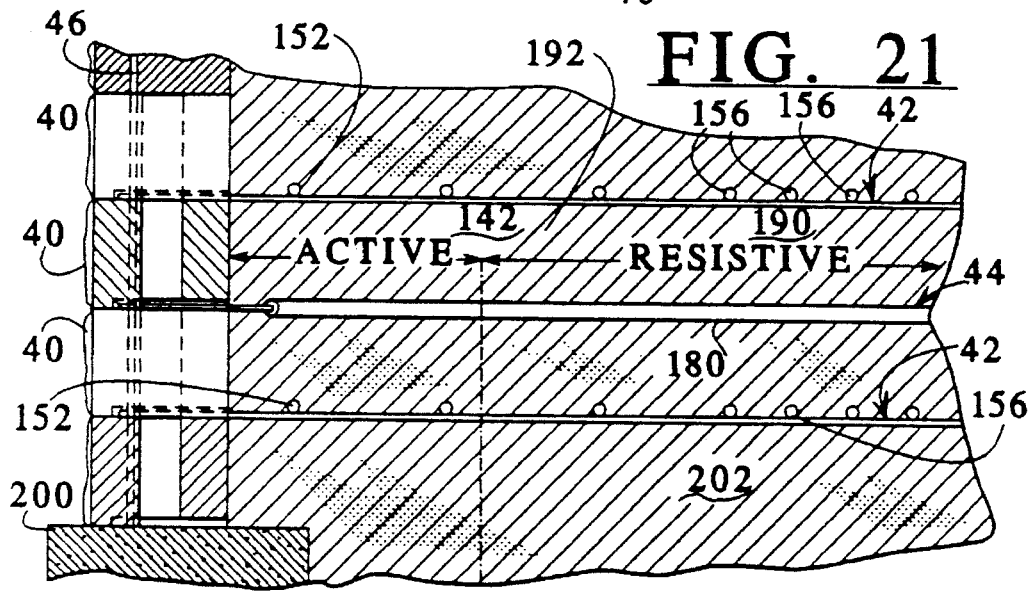

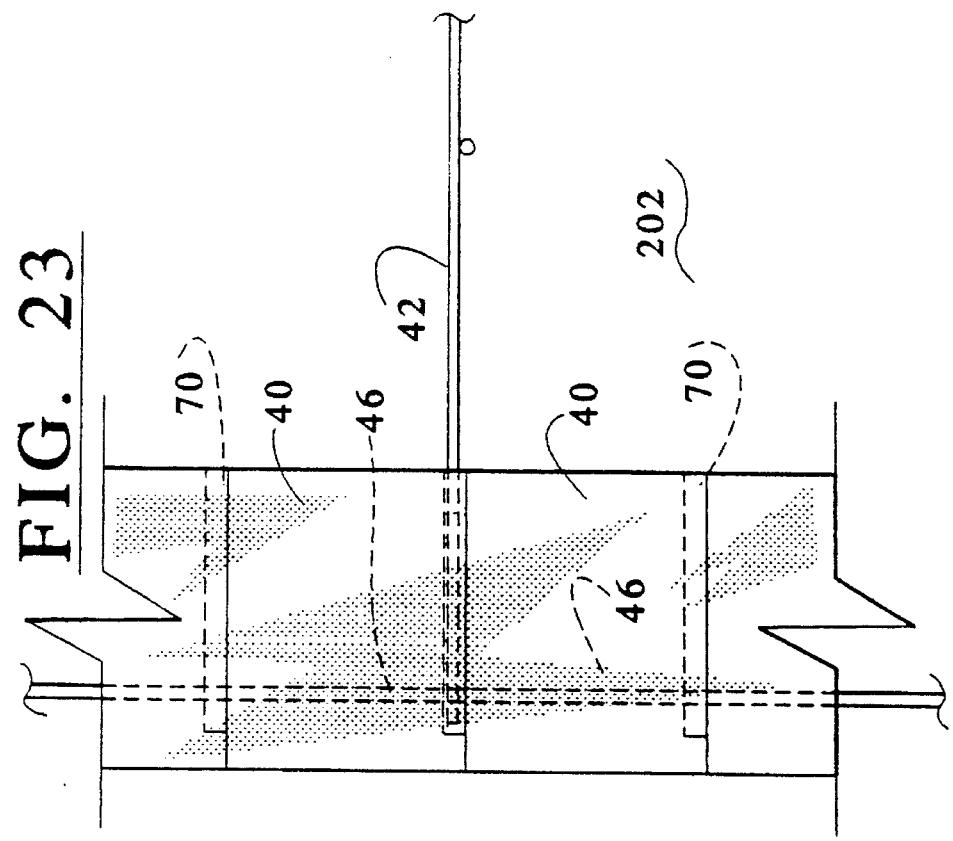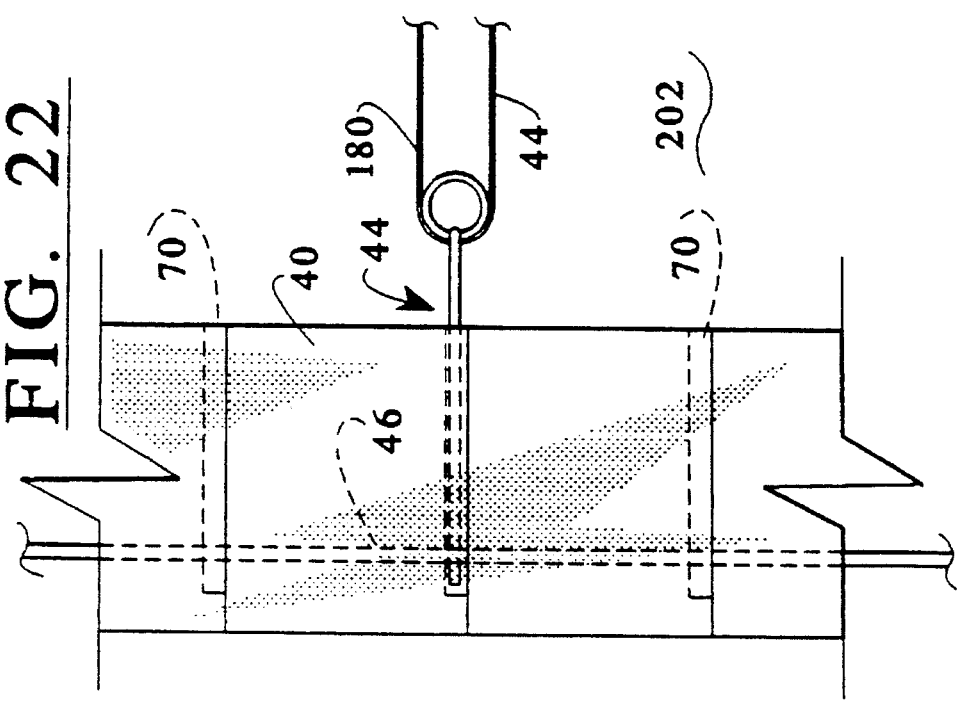

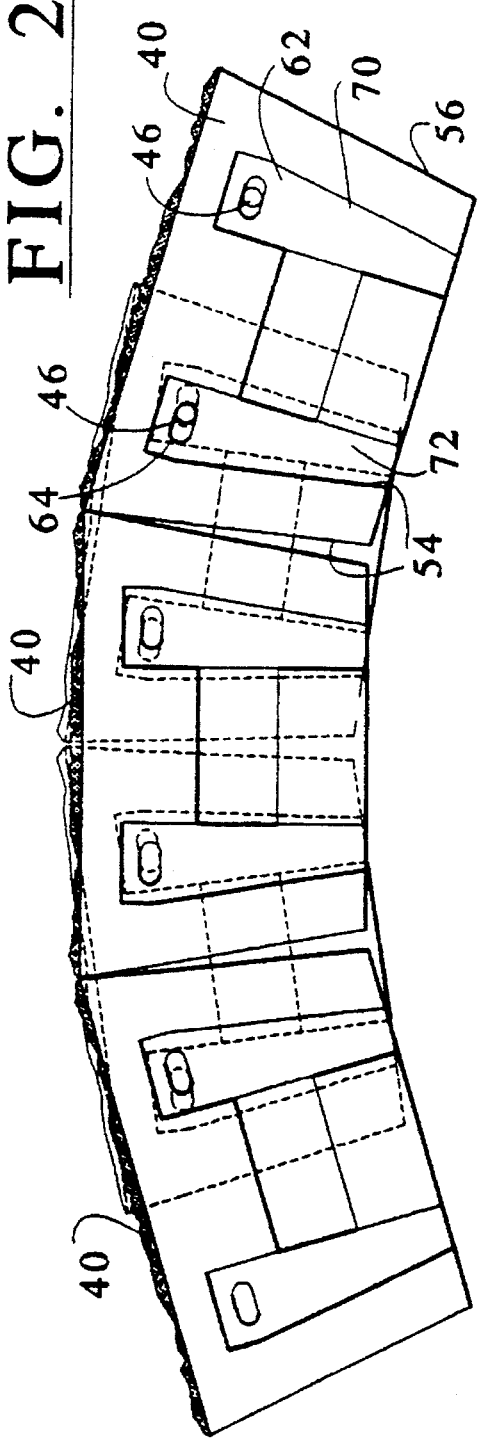
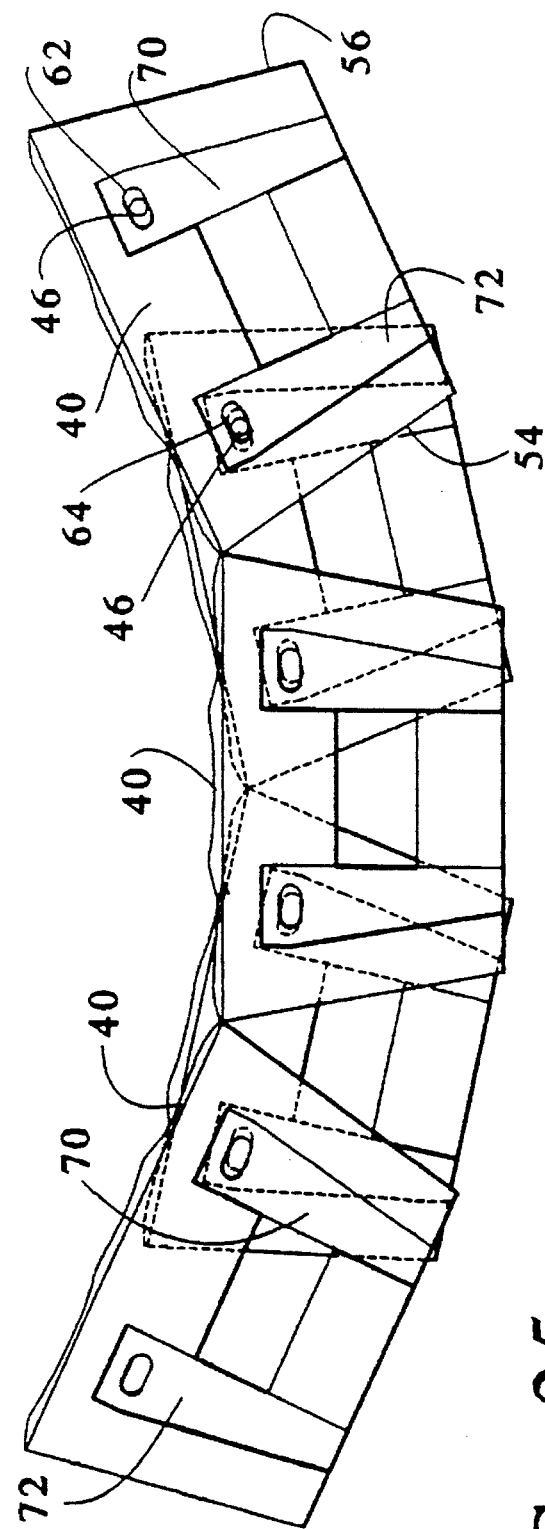

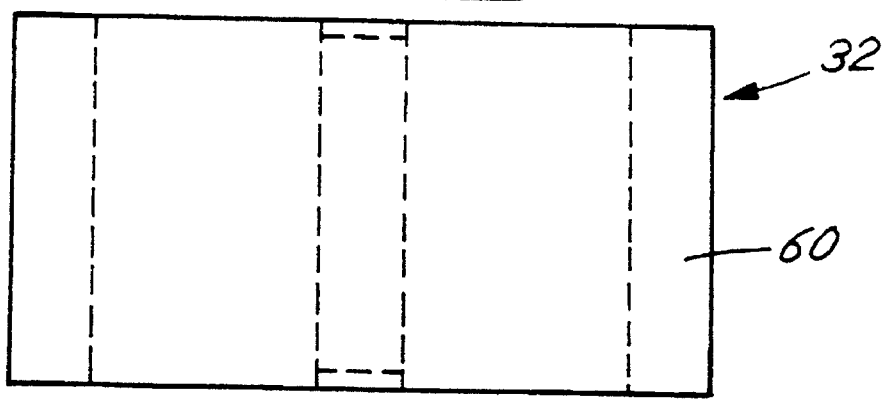
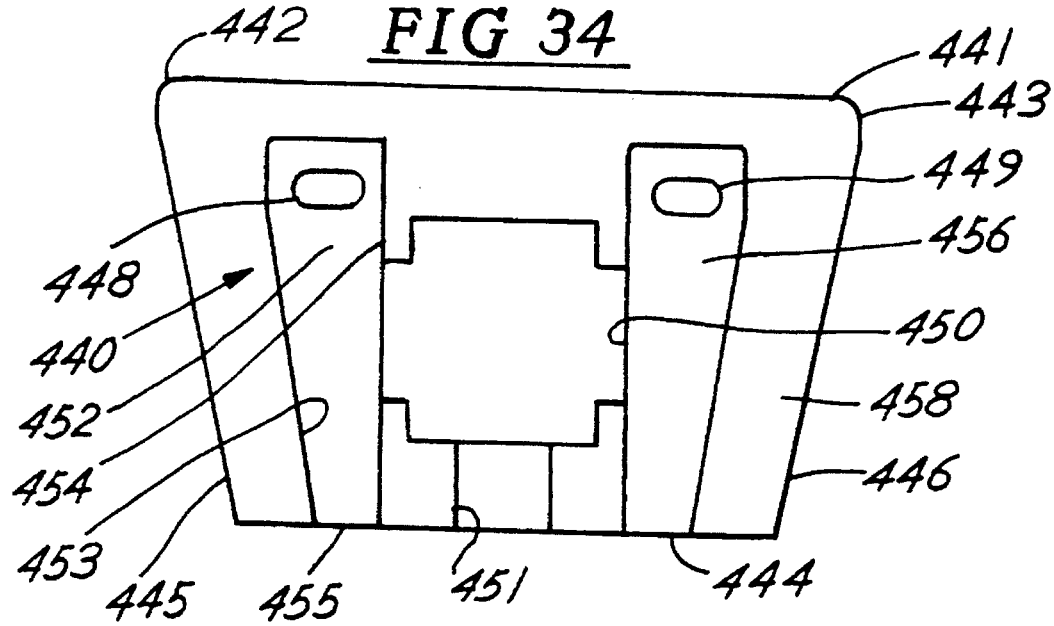
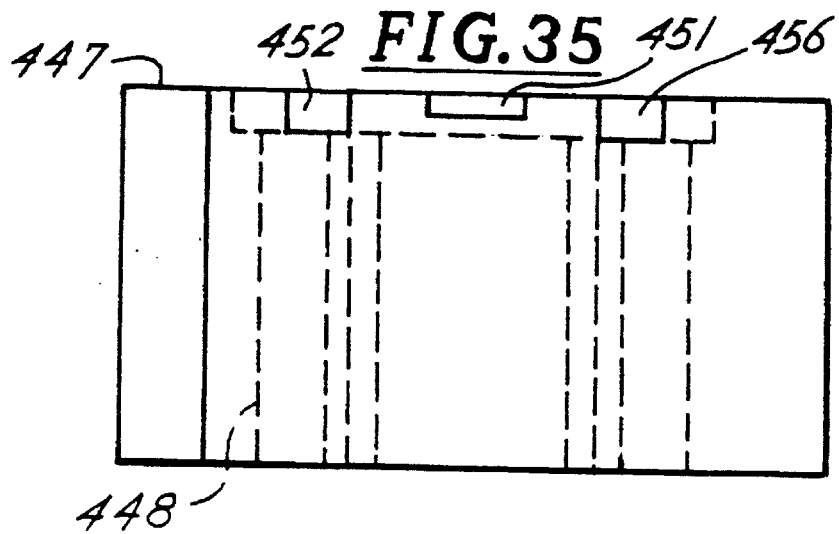

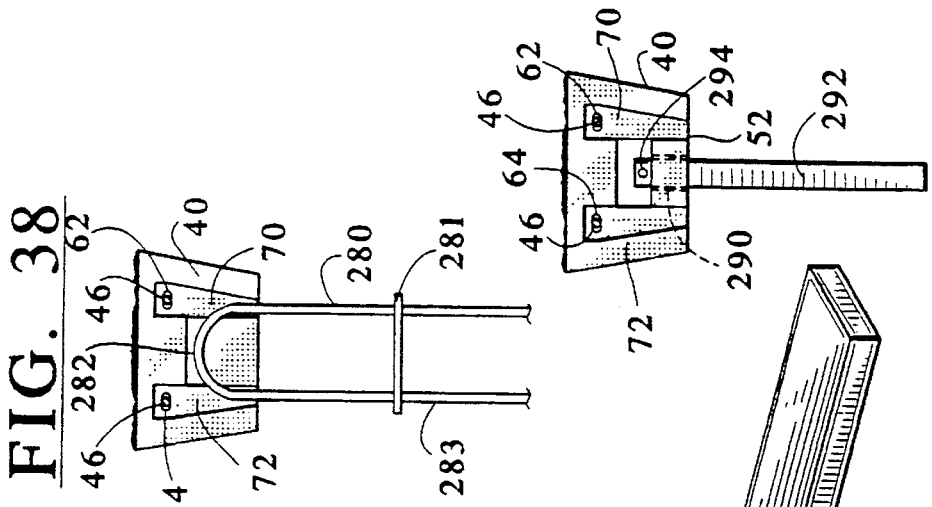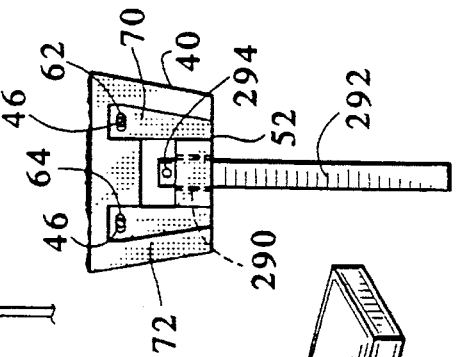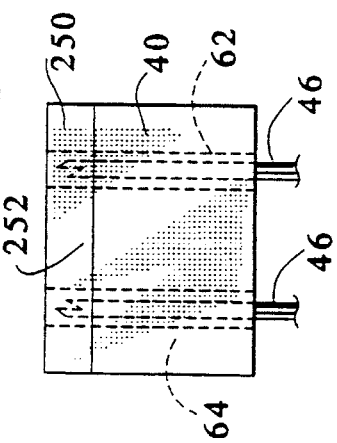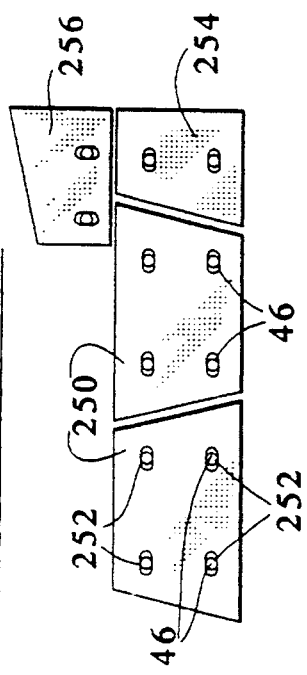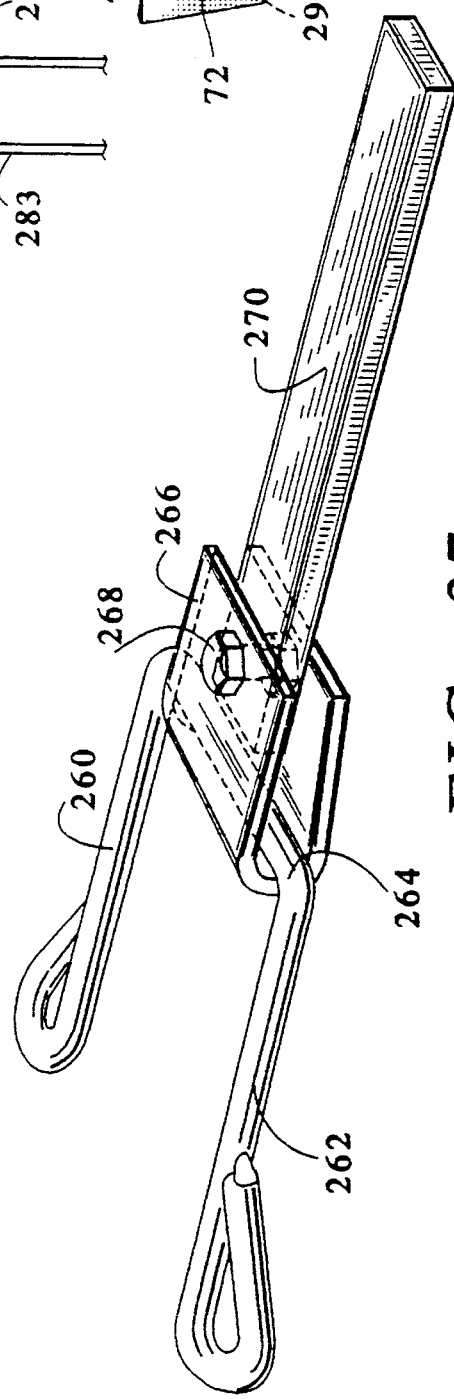

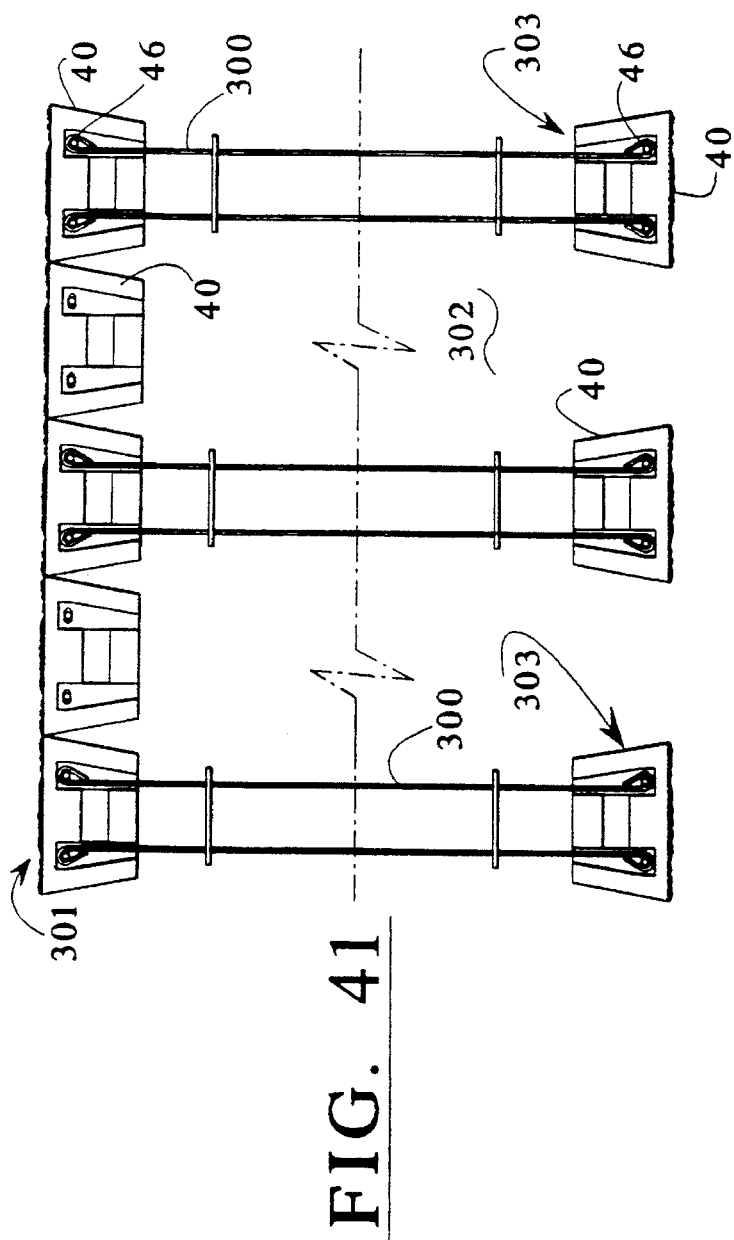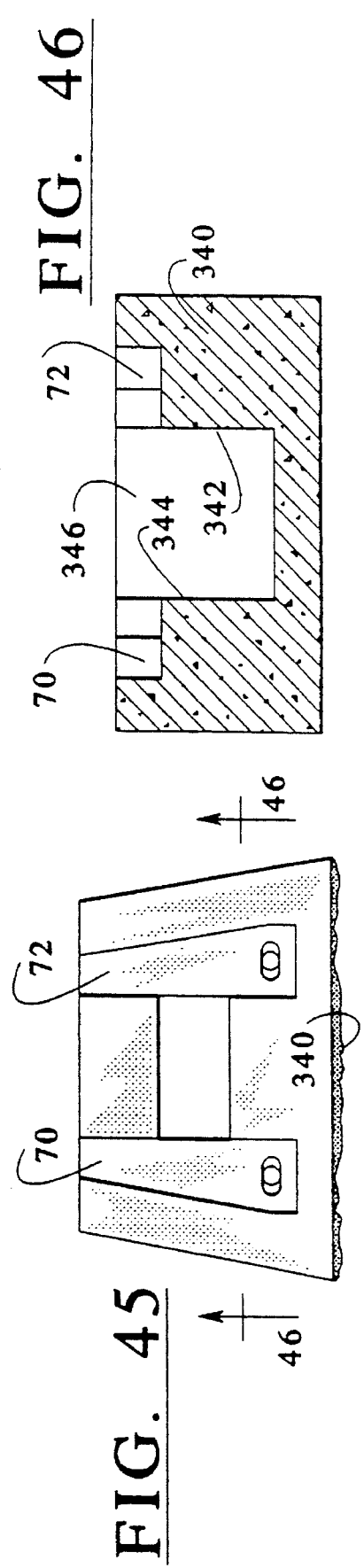

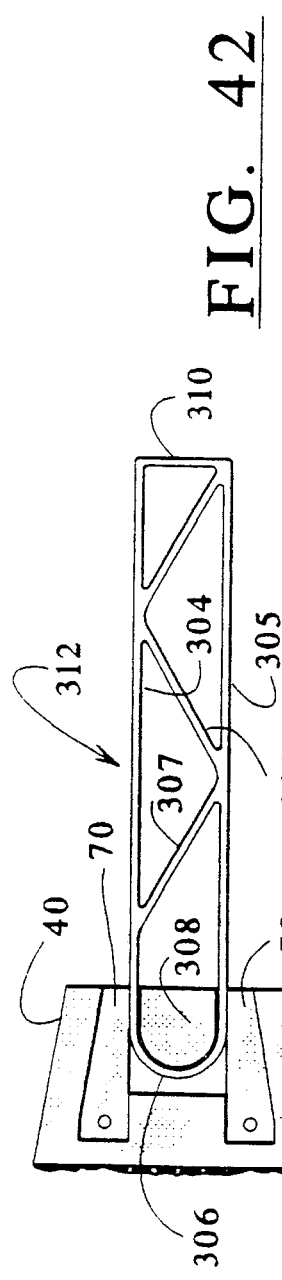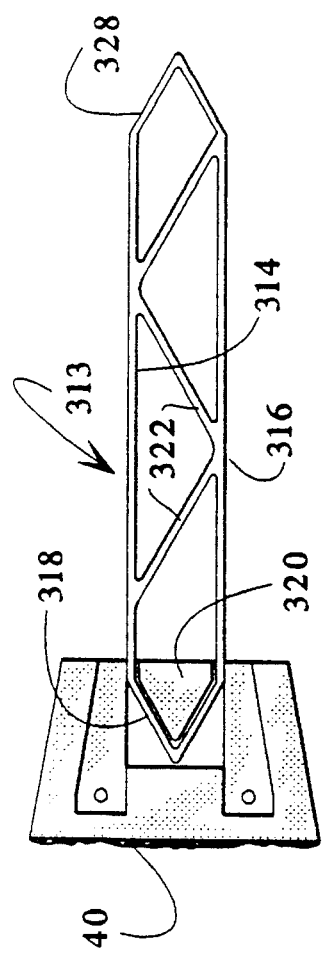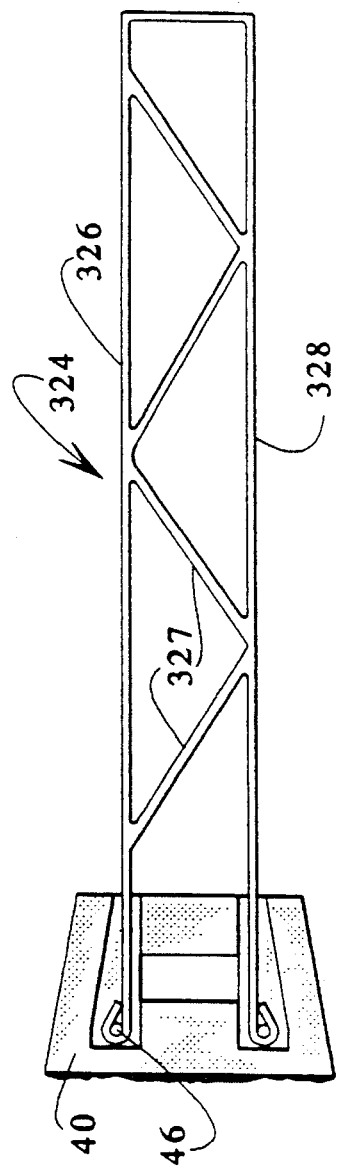

1

DUAL PURPOSE MODULAR BLOCK FOR CONSTRUCTION OF RETAINING WALLS

CROSS REFERENCE TO RELATED APPLICATION

This is a continuation-in-part application to U.S. patent application Ser. No. 08/108,933, filed Aug. 18, 1993 for Modular Block Retaining Wall Construction and Components U.S. Pat. No. 5,487,623 which is a continuation-in-part application to U.S. application Ser. No. 08/040,904, filed Mar. 31, 1993 for Modular Block Retaining Wall Construction and Components U.S. Pat. No. 5,507,599 and U.S. patent application Ser. No. 08/137,585, filed Oct. 15, 1993 for Low Elevation Wall Construction U.S. Pat. No. 5,474,405 all of for which priority is claimed and which are incorporated herewith by reference.

BACKGROUND OF THE INVENTION

This invention relates to an improved retaining wall construction and, more particularly, to a retaining wall construction comprised of modular blocks, in combination with tie-back and/or mechanically stabilized earth elements and compacted particulate or soil.

In U.S. Pat. No. 3,686,873 and No. 3,421,326, Henri Vidal discloses a new constructional work now known as a mechanically stabilized earth structure. The referenced patents also disclose methods for construction of mechanically stabilized earth structures such as retaining walls, embankment walls, platforms, foundations, etc. In a typical Vidal construction, particulate earthen material interacts with horizontal, longitudinal elements such as elongated steel strips positioned at appropriately spaced intervals in the earthen material. The elements are generally arrayed for attachment to a wall facing comprised of reinforced precast concrete wall panels, and the combination forms a cohesive embankment and wall construction. The elements, which extend into the earthen works, interact with compacted soil particles principally by frictional interaction and thus act to mechanically stabilize the earthen work. The elements may also perform a tie-back or anchor function.

Various embodiments of the Vidal development have been commercially available under various trademarks including the trademarks, REINFORCED EARTH embankments and RETAINED EARTH embankments. Moreover, other constructional works of this general nature have been developed. By way of example and not by way of limitation, Hilfiker in U.S. Pat. No. 4,324,508 discloses a retaining wall comprised of elongated panel members with wire grid mats attached to the backside of the panel members projecting into an earthen mass.

Vidal, Hilfiker and others generally disclose large precast, reinforced concrete wall panel members cooperative with strips, mats, etc. to provide a mechanically stabilized earth construction. Vidal, Hilfiker and others also disclose or use various shapes of wall panel members. It is also noted that in Vidal and Hilfiker the elements interactive with the compacted earth or particulate behind the wall panels or blocks are typically rigid steel strips or mats and rely upon friction and/or anchoring interaction, although ultimately all interaction between such elements and the earth or particulate is dependent upon friction.

It is sometimes difficult or not practical to work with large panel members like those disclosed in Vidal or Hilfiker inasmuch as heavy mechanical lifting equipment is often required to position such panels. In such circumstances, smaller blocks rather than panels may be used to define the wall. Forsberg in U.S. Pat. No. 4,914,876 discloses the use of smaller retaining wall blocks in combination with flexible plastic netting as a mechanically stabilizing earth element to thereby provide a mechanically stabilized earth retaining wall construction. Using flexible plastic netting and smaller, specially constructed blocks arranged in rows superimposed one upon the other, reduces the necessity for large or heavy mechanical lifting equipment during the construction phase of such a wall.

Others have also suggested the utilization of facing blocks of various configuration with concrete anchoring and/or frictional netting material to build an embankment and wall. Among the various products of this type commercially available is a product offered by Rockwood Retaining Walls, Inc. of Rochester, Minn. and a product offered by Westblock Products, Inc. and sold under the trade name, Gravity Stone. Common features of these systems appear to be the utilization of various facing elements in combination with backfill, wherein the backfill is interactive with plastic or fabric reinforcing and/or anchoring means which are attached to the facing elements. Thus, there is a great diversity of such combinations available in the marketplace or disclosed in various patents and other references.

Nonetheless, there has remained the need to provide an improved system utilizing anchoring and/or frictional interaction of backfill and elements positioned in the backfill wherein the elements are cooperative with and attachable to facing elements, particularly blocks which are smaller and lighter than large facing panels such as utilized in many installations. The present invention comprises an improved combination of elements of this general nature and provides enhanced versatility in the erection of retaining walls and embankments, as well as in the maintenance and cost of such structures.

SUMMARY OF THE INVENTION

Briefly, the present invention comprises a combination of components to provide an improved retaining wall system or construction as well as the components or elements from which the improved retaining wall is fabricated. An important feature of the invention is the modular wall block which is used as a facing component for the retaining wall construction. The modular wall block may be unreinforced and dry cast. The block includes a front face which is generally planar, but may be configured in almost any desired finish and shape. The wall block also includes generally converging side walls, generally parallel top and bottom surfaces, a back wall, vertical throughbores or passages through the block specially positioned to enhance the modular character of the block, and counterbores for the throughbores of a particular shape and configuration which permit the block to be integrated with and cooperative with various types of anchoring and/or earth stabilizing elements. Further, the wall block includes a center through passage generally parallel to the throughbores. The passage preferably extends entirely through the block and is arranged adjacent the back wall of the block. A channel or detent in the top and/or bottom surface of the block through the back wall connects to the passage. The wall block is useful in combination with vertical rods, tensile stabilizing elements, anchors, and adjacent blocks to provide a wall construction.

Various earth stabilizing and/or anchor elements are also disclosed for cooperation with the modular wall or face block and other blocks. A preferred embodiment of the earth stabilizing and/or anchoring elements includes first and second generally parallel tensile rods which are designed to extend longitudinally from the modular wall block into compacted soil or an earthen work. The ends of the tensile rods are configured to fit within counterbores defined in the top or bottom surface of the modular wall or facing block. Angled or transverse cross members connect the parallel tensile rods and are arrayed not only to enhance the anchoring characteristics, but also the frictional characteristics of interaction of the tensile rods with earth or particulate material comprising the embankment. The described wall construction further includes generally vertical anchoring rods that interact both with the stabilizing elements and also with the described modular blocks by extending vertically through the throughbores in those blocks and simultaneously engaging the stabilizing elements.

Numerous alternative stabilizing elements are also cooperative with the modular blocks. Among the elements cooperative with the wall blocks are precast, generally rectangular parallel piped blocks with a hollow core. Such blocks may be juxtaposed against the wall blocks and attached or connected by means of a separate connecting element which extends from the wall block passage to the hollow core.

Thus it is an object of the invention to provide an improved retaining wall construction comprised of modular blocks and stabilizing elements cooperative therewith that project into an earthen work or particulate material.

It is a further object of the invention to provide an improved and unique modular block construction for utilization in the construction of a improved retaining wall construction.

Yet another object of the invention is to provide a modular block construction which may be easily fabricated utilizing known casting or molding techniques.

Yet a further object of the invention is to provide a substantially universal modular wall block which is useful in combination with earth retaining or stabilizing elements, anchoring elements, and precast hollow core blocks.

Yet another object of the invention is to provide unique earth anchoring and/or stabilizing elements that are cooperative with a modular facing block.

Yet a further object of the invention is to provide a combination of components for manufacture of a retaining wall system or construction which is inexpensive, efficient, easy to use and which may be used in designs associated with conventional design criteria.

Another object of the invention is to provide a design for a modular block which may be used in a mechanically stabilized earth construction or an anchor wall construction wherein the block may be unreinforced and/or manufactured by dry cast or precast methods, and/or interactive with rigid, metal stabilizing elements as well as flexible stabilizing elements such as geotextiles.

These and other objects, advantages and features of the invention will be set forth in the detailed description which follows.

BRIEF DESCRIPTION OF THE DRAWING

In the detailed description which follows, reference will be made to the drawing comprised of the following figures:

FIG. 4 is an isometric view of a typical anchoring rod which interacts with the wall block of FIG. 2 and the earth stabilizing element of FIG. 3 in the construction of the improved retaining wall of the invention;

FIG. 4A is an alternate construction of the rod of FIG. 4;

FIG. 5 is a bottom plan view of the block of FIG. 2;

FIG. 6 is a rear elevation of the block of FIG. 5;

FIG. 7 is a side elevation of the block of FIG. 5;

FIG. 11 is a top plan view of an alternative corner block construction;

FIG. 12 is a rear elevation of the block of FIG. 11;

FIG. 13 is a side elevation of the block of FIG. 11;

FIG. 14 is a top plan view of a typical earth stabilizing element or component of the type depicted in FIG. 3;

FIG. 15 is a top plan view of an alternative earth stabilizing element;

FIG. 15A is an isometric view of an alternative for the element of FIG. 15;

FIG. 18 is a front elevation of a typical assembly of the modular wall blocks of FIG. 2 and corner blocks such as shown in FIG. 8 in combination with the other components and elements forming a retaining wall;

FIG. 19 is a sectional view of the wall of FIG. 18 taken substantially along the line 19—19;

FIG. 20 is a sectional view of the wall of FIG. 18 taken along line 20—20 in FIG. 18;

FIG. 21 is a cross sectional view of the wall of FIG. 18 taken substantially along the line 21—21;

FIG. 22 is a side sectional view of a combination of the type depicted in FIG. 17;

FIG. 23 is a side sectional view of a combination of elements of the type depicted in FIG. 16;

FIG. 24 is a top plan view of a typical retaining wall construction depicting the arrangement of the modular block elements to form an outside curve;

FIG. 25 is a top plan view of modular block elements arranged so as to form an inside curve;

FIG. 33 is a front plan view of an alternative facing block used to practice the invention with tensile rod type stabilizing elements and precast block anchors or stabilizing elements;

FIG. 34 is a top plan view of the facing block of FIG. 33;

FIG. 35 is a rear plan view of the facing block of FIG. 33;

FIG. 36 is a front elevation of a wall construction with a cap block;

FIG. 36A is a top plan view of cap blocks;

FIG. 37 is an isometric view of an alternative stabilizing element;

FIG. 38 is a top plan view of an alternative stabilizing element and wall block construction;

FIG. 39 is a plan view of another alternative stabilizing element and wall block construction;

FIG. 41 is a top plan view of the wall construction of FIG. 40;

FIG. 42 is a top plan view of an alternative stabilizing element construction;

FIG. 43 is a top plan view of another alternative stabilizing element construction;

FIG. 44 is a top plan view of another stabilizing element construction;

FIG. 45 is a bottom plan view of an alternative cap block construction; and

FIG. 46 is a cross sectional view of the alternative cap block construction of FIG. 45 taken along the line 46—46.

DESCRIPTION OF THE PREFERRED EMBODIMENTS

General Description

Figure 1:
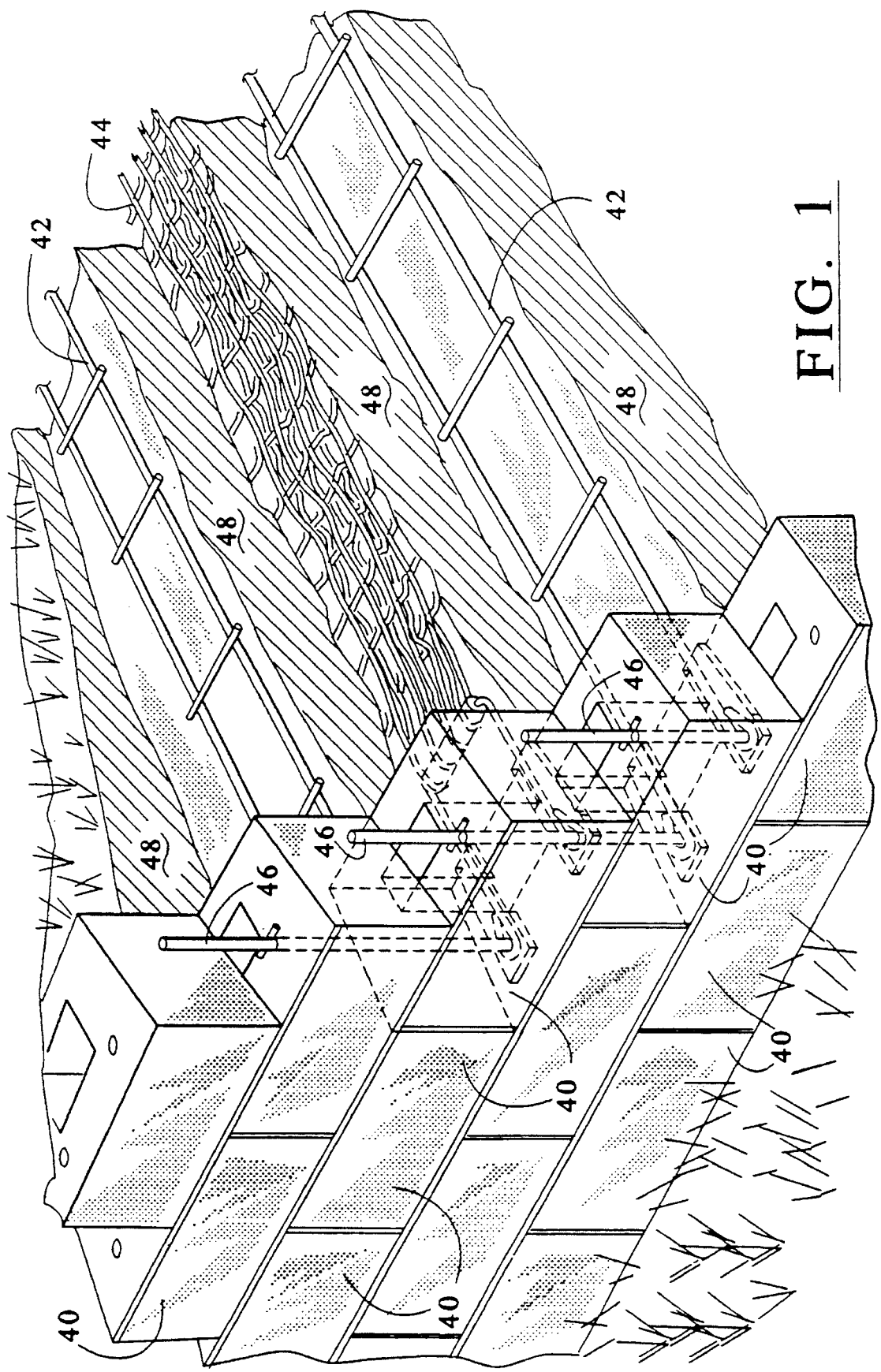
FIG. 1 is an isometric, cut away view of an embodiment and example of the modular block retaining wall construction of the invention incorporating various alternative elements or components.
Figure 30:
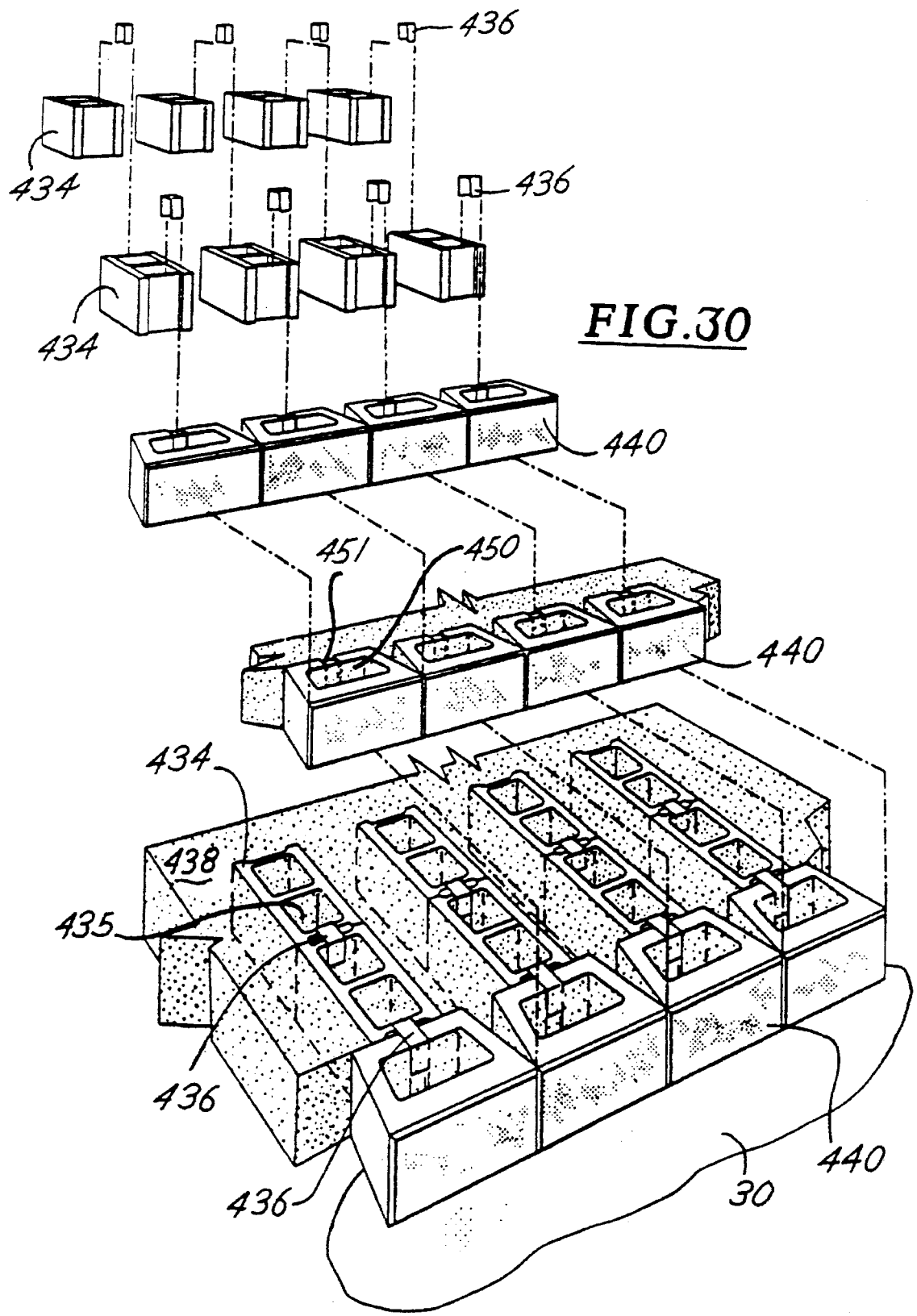
FIG. 30 is a cut-away, exploded isometric view of a retaining wall construction of the invention utilizing a modular facing block having an alternative or modified construction useful in combination with precast blocks as well as stabilizing elements.

FIG. 1 depicts the combination of components or elements which define a preferred embodiment of the modular block retaining wall construction of the invention. FIG. 30 depicts another embodiment described in detail below. In FIG. 1, modular facing or wall blocks 440 are arranged in courses one upon the other in an overlapping array. Generally rigid earth retaining or stabilizing elements 42 and/or flexible stabilizing elements 44 are cooperative with or interact with the blocks 440. Also anchoring elements such as tie back elements may be utilized in cooperation with blocks 440. The stabilizing or anchoring elements 42, 44 are attached to blocks 440 by means of vertical anchoring rods 46. The elements 42 and/or 44 project from the back face of blocks 440 into compacted soil 48 and interact with the soil 48 as anchors and/or frictionally. In FIG. 30, block 440 are utilized in combination with precast anchor blocks 434 connected together by clips or connectors 436 retained in compacted soil 438. The block 440 is utilized in both of the embodiments of FIG. 1 and FIGS. 30 and 32 and thus has dual or multiple usage in the construction of such walls.

It is noted that interaction between the elements 42 and 44 and soil or particulate 48 depends ultimately upon frictional interaction of particulate material comprising the soil 48 with itself and with elements, such as elements 42 and 44. Conventionally, that interaction may be viewed as an anchoring interaction in many instances rather than a frictional interaction. Thus, for purposes of the disclosure of the present invention, both frictional and anchoring types of interaction of compacted soil 48 with stabilizing and/or anchor elements are considered to be generally within the scope of the invention.

The invention comprises a combination of the described components including the blocks 40, anchoring and/or stabilizing elements 42 and/or 44, vertical connecting rods 46 and soil 48 as well as the separate described components themselves, the method of assembly thereof, the method of manufacture of the separate components and various ancillary or alternative elements and their combination. Following is a description of these various components, combinations and methods.

Facing Block Construction

Figure 2:
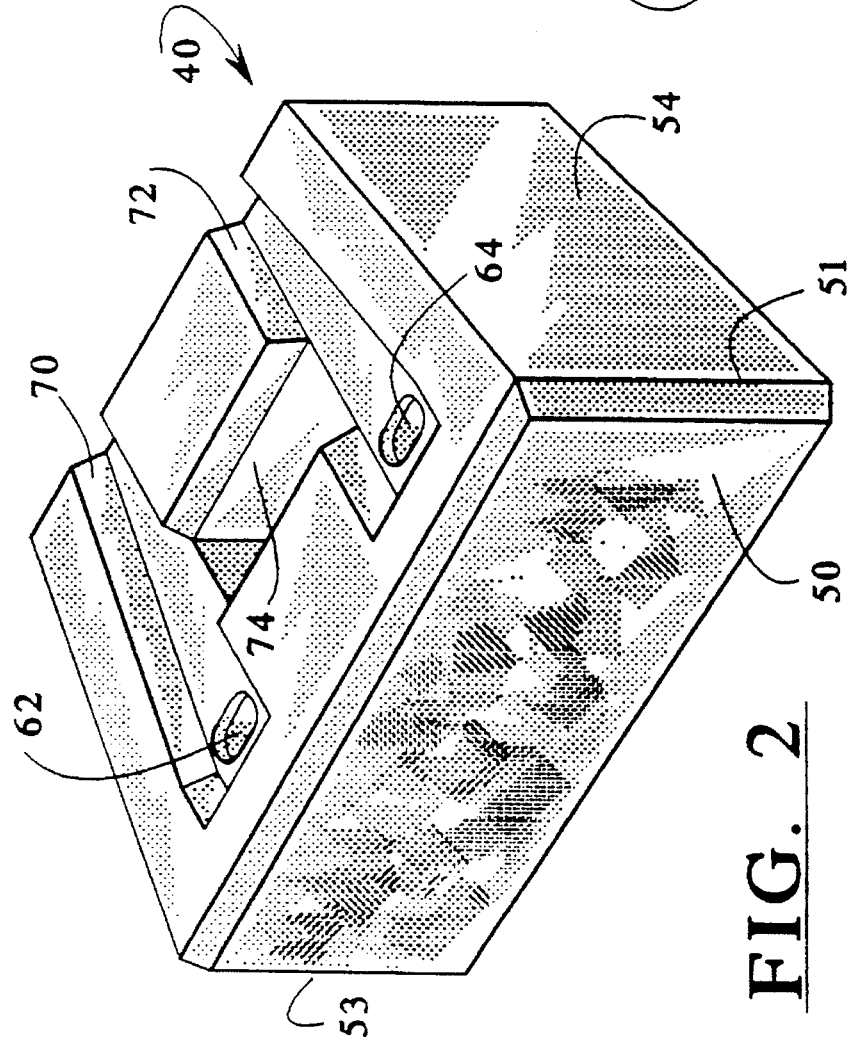
FIG. 2 is an isometric view of the improved standard modular wall block utilized in the retaining wall construction of the invention.

FIGS. 1 and 2, as well as FIGS. 5 through 13, 30 through 35, 44 and 45 illustrate in greater detail the construction of two embodiments of standard modular or facing blocks 40 and 440 as well as various other blocks. FIG. 2, as well as FIGS. 5 through 7, depict a first embodiment of a basic modular block 40 which is associated with the invention. FIGS. 1 and 30 through 35 depict an alternative modular block 440.

Standard Modular Block

As depicted in FIGS. 2 and 5 through 7, one standard modular block 40 includes a generally planar front face 50. The front face 50, in this preferred embodiment, is typically aesthetically textured as a result of the manufacturing process. Texturing is, however, not a limiting characteristic of the front face 50. The front face 50 may include a precast pattern. It may be convex or concave or some other desired cast or molded shape. Because the block 40 is manufactured principally by casting techniques, the variety of shapes and configurations, surface textures and the like for the front face 50 is not generally a limiting feature of the invention.

The front face 50, however, does define the outline of the modular blocks comprising the wall as shown in FIG. 1. Thus, the front face 50 defines a generally rectangular front elevation configuration, and because the blocks 40 are typically manufactured by means of casting techniques, the dimensions of the perimeter of front face 50 are typically those associated with a standard concrete block construction. The size or dimension, however, is not a limiting feature of the invention.

Spaced from and generally parallel to the front face 50 is a back face 52. The back face 52 is connected to the front face 50 by means of side walls 54 and 56 which generally converge towards one another from the front wall 50. The convergence is generally uniform and equal on both sides of the block 40. Convergence may commence from front edges 51, 53, or may commence a distance from front face 50 toward back face 52. Convergence may be defined by a single flat side surface or multiple flat or curved side surfaces. The convergence angle is generally in the range of 7° to 15° in the preferred embodiment of the invention.

The thickness of the block 40 or in other words, the distance between the front face 50 and back face 52 may be varied in accord with engineering and structural considerations. Again, typical dimensions associated with concrete block constructions are often relied upon by casters and those involved in precast or dry cast operations of block 40. Thus, for example, if the dimensions of the front face 50 are 16 inches wide by 8 inches high, the width of the back face would be approximately 12 inches and the depth or distance between the faces 50, 52 would be approximately 8 inches.

In the embodiment shown, the side walls 54 and 56 are also rectangular as is the back face 52. Parallel top and bottom surfaces 58 and 60 each have a trapezoidal configuration and intersect the faces 50, 52 and walls 54, 56. In the preferred embodiment, the top and bottom surfaces 58, 60 are congruent and parallel to each other and are also at generally right angles with respect to the front face 50 and back face 52.

The block 40 includes a first vertical passage or throughbore 62 and a second vertical passage or throughbore 64. Throughbores 62, 64 are generally parallel to one another and extend between surfaces 58, 60. As depicted in FIG. 5 the cross sectional configurations of the throughbores 62 and 64 are preferably uniform along their length. The throughbores 62, 64 each include a centerline axis 66 and 68, respectively. The cross sectional shape of each of the throughbores 62 and 64 is substantially identical and comprises an elongated or elliptical configuration or shape.

Each of the throughbores 62 and 64 and, more particularly, the axis 66 and 68 thereof, is relatively precisely positioned relative to the side edges 51 and 53 of the front face 50. The side edges 51 and 53 are defined by the intersection respectively of the side wall 54 and front face 50 and side wall 56 and front face 50. The axis 66 is one-quarter of the distance between the side edge 53 and the side edge 51. The axis 68 is one-quarter of the distance between the side edge 51 and the side edge 53. Thus the axes 66 and 68 are arrayed or spaced one from the other by a distance equal to the sum of the distances that the axes 66, 68 are spaced from the side edges 51 and 53.

The throughbores 62 and 64 are positioned intermediate the front face 50 and back face 52 approximately one-quarter of the distance from the front face 50 toward the back face 52, although this distance may be varied depending upon engineering and other structural considerations associated with the block 40. As explained below, compressive forces on the block 40 result when an anchoring or vertical connecting rod 46, which fits within each one of the throughbores 62 and 64, engages against a surface of each throughbore 62 or 64 most nearly adjacent the back face 52. The force is generally a compressive force on the material comprising the block 40. Thus, it is necessary, from a structural analysis viewpoint, to ensure that the throughbores 62 and 64 are appropriately positioned to accommodate the compressive forces on block 40 in a manner which will maintain the integrity of the block 40.

A counterbore 70 is provided with the throughbore 62. Similarly, a counterbore 72 is provided with the throughbore 64. Referring first to the counterbore 70, the counterbore 70 is defined in the surface 58 and extends from back face 52 over and around the throughbore 62. Importantly, the counterbore 70 defines a pathway between the throughbore 62 and the back face 52 wherein a tensile member (described below) may be placed in a manner such that the tensile member may remain generally perpendicular to an element, such as rod 46, positioned in the throughbore 62. The tensile member (described below) will thus be recessed in block 40 permitting blocks 40 to be stacked top surface 58 to bottom surface 60.

In a similar fashion, the counterbore 72 extends from the back face 52 in the surface 58 and around the throughbore 64. In the preferred embodiment, the counterbores 70 and 72 are provided in the bottom face 60 uniformly for all of the blocks 40. However, it is possible to provide the counterbores in the top face 58 or in both faces 58 and 60. Note that since the blocks 40 may be inverted, the faces 58 and 60 may be inverted between a top and bottom position. In sum, the counterbores 70 and 72 are aligned with and constitute counterbores for the throughbores 62 and 64, respectively.

A rectangular cross section passage 74 extends parallel to the throughbores 62 and 64 through the block 40 from the top surface 58 to the bottom surface 60. The passage 74 is provided to eliminate weight and bulk of the block 40 without reducing the structural integrity of the block. It also provides a transverse counterbore connecting counterbores 70 and 72. The passage 74 is not necessarily required in the block 40. The particular configuration and orientation, shape and extent of the passage 74 may be varied considerably in order to eliminate bulk and material from the block 40.

The general cross section of the throughbores 62 and 64 may be varied. Importantly, it is appropriate and preferred that the cross sectional shape of the throughbores 62 and 64 permits lateral movement of the block 40 relative to anchoring rods 46, for example, which are inserted in the throughbores 62 and 64. Thus, the dimension of the throughbores 62 and 64 in the direction parallel to the back face 52 in the embodiment shown is chosen so as to be greater than the diameter of a rod 46. The transverse (or front to back) dimension of the throughbores 62 and 64 more closely approximates the diameter of the rod 46 so that the blocks 40 will not be movable from front to back into and out of a position. That is, the front face 50 of each of the blocks 40 in separate courses and on top of each other can be maintained in alignment because of the size and configuration of throughbores 62, 64. Consequently, the blocks 40 can be preferably adjusted from side to side as one builds a wall of the type depicted in FIG. 1, though the blocks 40 are not adjustable inwardly or outwardly to any great extent. This maintains the planar integrity of the assembly comprising the retaining wall so that the blocks 40 will be maintained in a desired and generally planar array. Side to side adjustment insures that any gap between the blocks 40 is maintained at a minimum and also permits, as will be explained below, various adjustments such as required for formation of inside and outside curvature of the wall construction.

The depth of the counterbores 70 and 72 is variable. It is preferred that the depth be at least adequate to permit the elements 42 and/or 44 to be maintained below or no higher than the level of surface 58, so that when an additional course of blocks 40 is laid upon a lower course of blocks 40, the elements 42 and/or 44 are appropriately and properly recessed so as not to interfere with an upper course of blocks 40.

Figure 3:
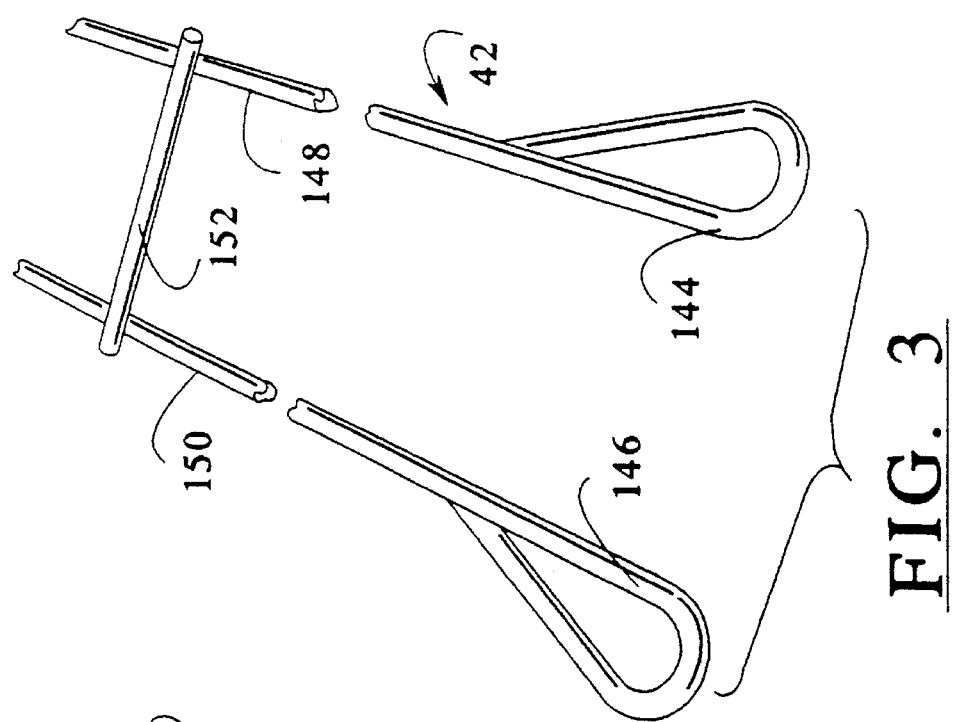
FIG. 3 is an isometric view of an earthen stabilizing and/or anchor element which is used in combination with the modular block of FIG. 2 and which cooperates with and interacts with earth or particulate by means of friction and/or anchoring means or both.
Figure 32:
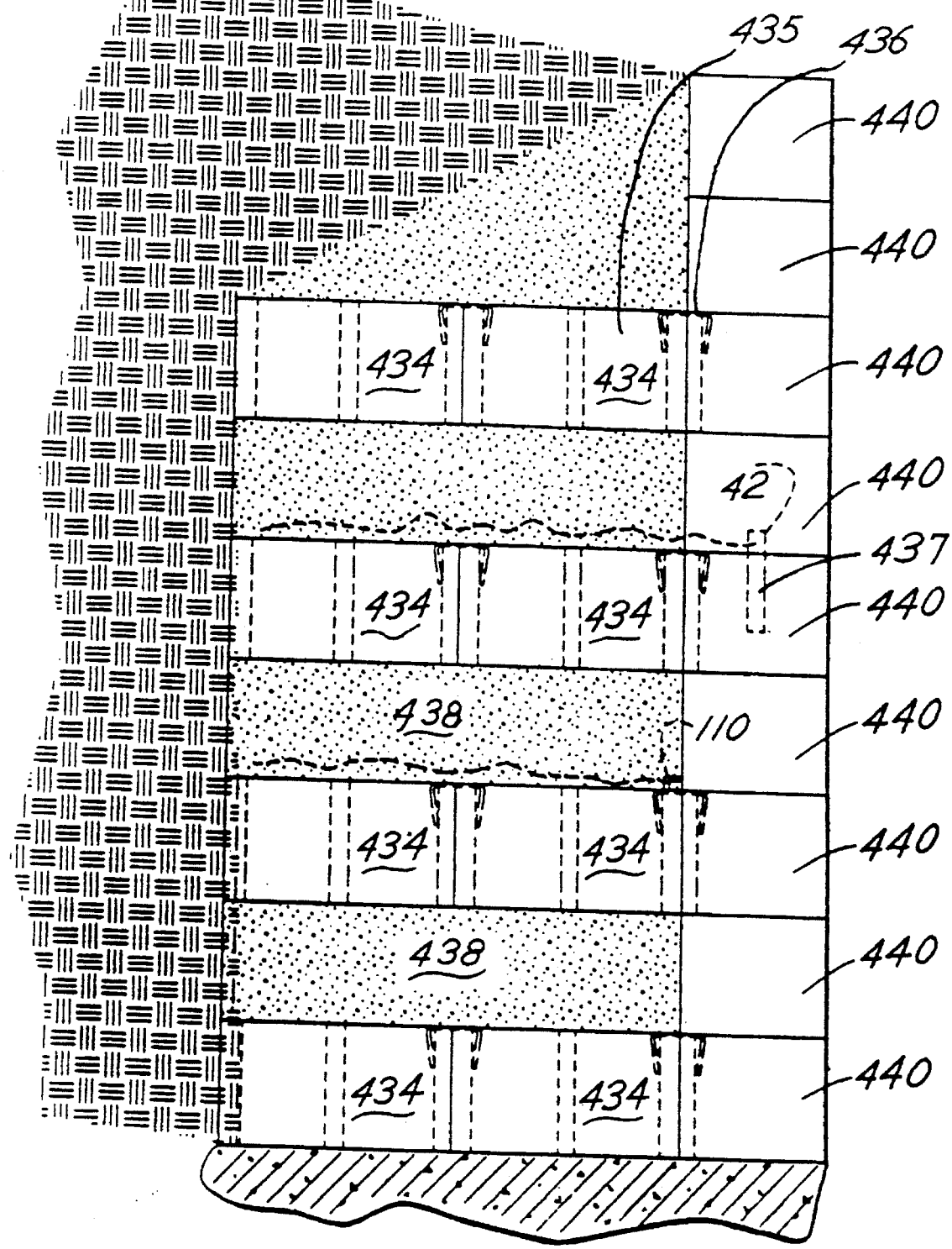
FIG. 32 is a side elevation of a wall of the type shown in FIG. 30.

FIGS. 33, 34 and 35 depict an alternate construction of a facing block which may be used in combination with other elements and components to provide a retaining wall. The block 440 of FIGS. 33, 34 and 35 may be used in combination with stabilizing elements of the type shown in FIGS. 1 and 3 as stabilizing elements 46. Alternatively, the block 440 may be used in combination with standard precast concrete blocks 44 such as shown in FIG. 32. Thus, the block 440 has broad utility and application as will be described in further detail below.

Referring now to FIGS. 33, 34 and 35, the block 440 includes a front face 441. The front face is a generally planar face defined by side edges 442 and 443 which are generally vertical when positioned as part of a retaining wall. The side edges 442 and 443 may be chamfered. The front face 441 is generally rectangular in shape. It may be textured, curved, patterned or the like. The front face 441 is spaced from and parallel to a back face 444. The back face 444 is connected to the front face by converging side faces 445 and 446 respectively. The side edges or faces 445 and 446 converge from the front face 441 toward the back face 444. The angle of convergence may be in the range of 5 to 20 degrees. It is also possible to eliminate the convergence, though in the preferred embodiment, there is a convergence of the faces 445 and 446.

The peripheral faces comprising the front face 441, the back face 444 and the side faces 445 and 446 are intersected by a top surface 447 and a bottom surface 448. The surfaces 447 and 448 are preferably parallel to one another. The block 440 may be substituted as previously mentioned for the block 40 in the construction depicted in FIG. 1 and used in combination with the stabilizing element of the type depicted in FIG. 2. The block 440 further includes first and second vertical, parallel throughbores 448 and 449 which extend entirely therethrough from the top surface 447 through the bottom surface 448. Each of the throughbores 448 and 449 have a transverse profile which is generally elongated or elliptical so that when a rod, for example a rod 46, is inserted through the throughbores 448 and 449, the block 440 may be adjusted laterally or from side to side. The throughbore 448, thus for example, has a profile as depicted in FIG. 34. This profile has an elongated dimension which is generally directed between the side faces 445 and 446 and parallel to the front face 441 and back face 444. The narrow dimension of the profile of the throughbore 448 is perpendicular the front face 441 and depicted in FIG. 34. The size of the throughbore 448 is dimensioned so that a reinforcing bar, for example rod 46, may be received therethrough. The reinforcing bar 46, of course as previously explained, interconnects the blocks 440 forming the overlying horizontal courses or rows of blocks 440. Throughbores 448 and 449 are of a substantially identical construction and are spaced from the front face 441 as well as from the edges 442 and 443 in the manner previously described with respect to the block 40. Thus, the throughbores 448 and 449 define vertical, central axes which are one quarter (¼) of the distance from each side edge 442 and 443. This modular spacing permits construction and erection of a retaining wall as previously described.

A hollow throughbore or passage or core 450 extends from the top surface 447 through the bottom surface 448. The throughbore 450 has a cruciform shape. The throughbore 450 connects through the block 440 and through the back face 444 by means of a channel 451. The channel 451 is positioned substantially in the center of the block between the sides 445 and 446 and has a depth sufficient to receive clip member 446 as described in greater detail below with respect to FIGS. 30, 31 and 32. In any event, a typical dimension of the channel 451 or block 440 having a width of approximately sixteen (16) inches is a channel width of two (2) inches and a depth of three eighths (⅜) to five eighths (⅝) inches. The dimensions of the construction of the block 440 may be altered, however, without departing from the spirit and scope of the invention.

Associated with each of the throughbores 448 and 449 are counterbores 452 and 456 respectively. Referring first to the counterbore 452, the counterbore 452 is comprised of a region which surrounds the throughbore 448 so as to enable a reinforcing bar to be positioned about a rod 46, for example, extending through the throughbore 448 again in the manner previously described with respect to the block 40. The channel 452 further extends from around the throughbore 448 and outwardly through the back face 444 defining thereby a series of side walls or side channel walls 453, 454 and 455. The walls 454 and 455 are appropriately spaced from the wall 453 to enable a tension member associated with a stabilizing element to fit therein and to be recessed below the level of surface 447. It is also noted that the walls 454 and 455 are spaced from one another thus defining therebetween an opening in the side wall of the channel effectively defining a cross counterbore through the space of the hollow throughbore 450 connecting to the generally parallel adjacent counterbore 456. The counterbore 456 has a similar construction to that of the counterbore 452 and constitutes a mirror image thereof. As an additional alternative feature for the block 440, it is possible to include lateral or side extending channels 457 and 458 which extend respectively from the counterbores 452 and 456 laterally through the side walls 445 and 446. The channels 457 and 458 preferably have a depth substantially equal to the depth of the counterbores 452 and 456 to enable positioning of rod members or other similar connecting members in those channels.

Whereas FIGS. 33, 34 and 35 disclose the construction of the block 440 and the various throughbores and counterbores therein, FIG. 1 discloses a construction which utilizes a block of the type shown in FIG. 4. That is, the block 440 may be substituted for the block 40 in FIG. 1. The counterbores 452 and 456 in combination with the vertical throughbores 448 and 449 lack the stabilizing elements and vertical rods in the manner described with respect to a wall constructed in accord with the description associated with the block 40. Numerous types of stabilizing elements may be used in combination with the block 440 again as previously described.

Figure 31:
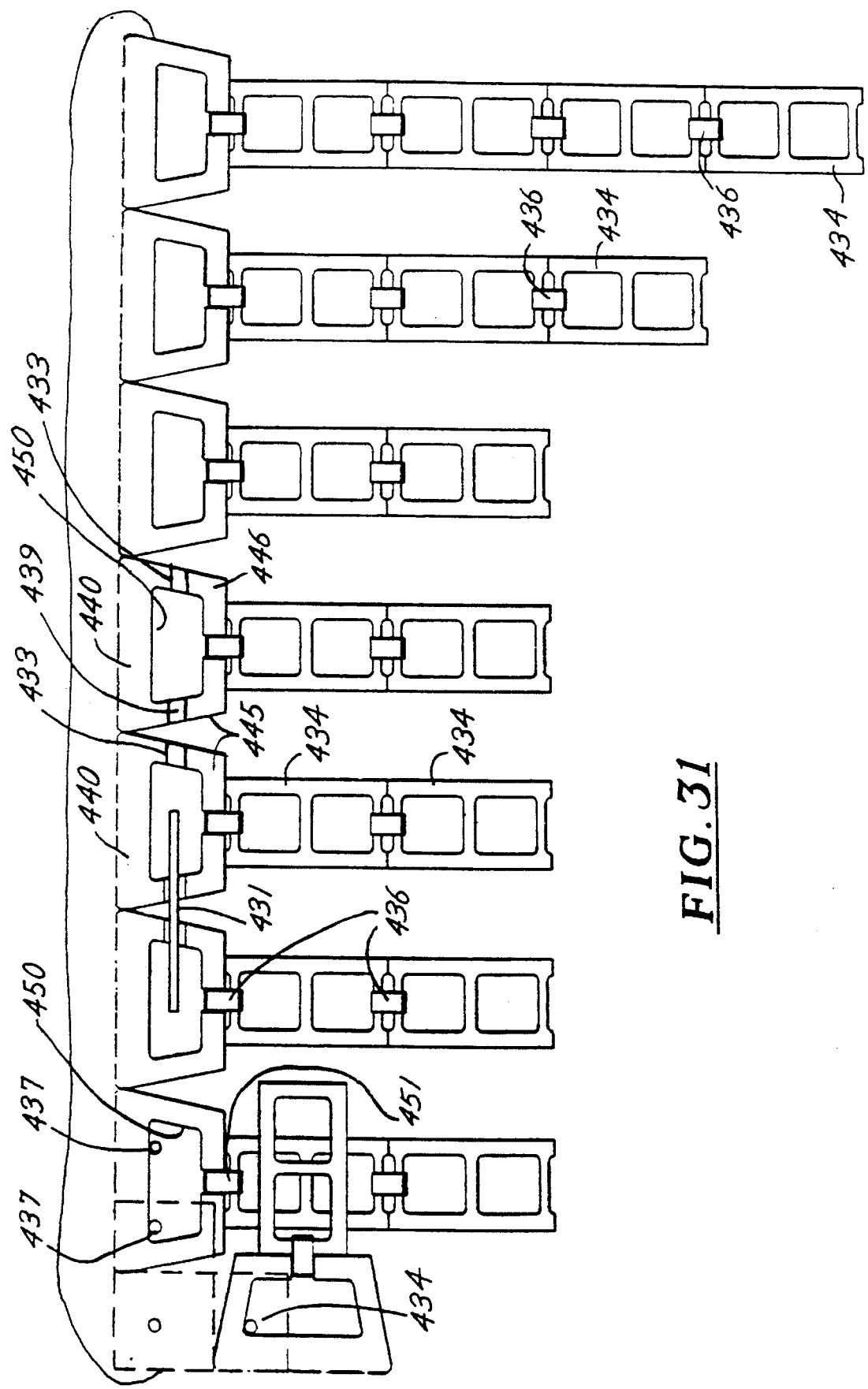
FIG. 31 is a top plan view of a wall of the type shown in FIG. 30, wherein a right angle corner is incorporated in the wall.

FIGS. 30, 31 and 32 describe an alternative usage of the block 440 in a wall wherein the block 440 is used in combination with precast concrete block element 434. Thus, the facing elements or facing blocks 440 are stacked one upon the other in courses as depicted, for example, in FIG. 32. The hollow core concrete blocks 434 are positioned adjacent the back face 444 of selected blocks 440. They are connected thereto by means of clips 436 which fit into the hollow throughbore 450 and connect a hollow passage 435 to the block 434. Multiple blocks 434 may be connected together with a single facing block 440 again as depicted in the figures by means of clips 436 or other elements designed to connect the blocks. The blocks 440 may be connected vertically by means of pins or elements such as elements 437 in FIG. 32. The blocks 440 in the configuration and embodiment as depicted in FIGS. 30, 31 and 32 may also be connected by means of rods, for example, which are positioned within the channels 457 and 458. Thus, the block 440 can be used in a universal manner either with stabilizing elements of the type depicted and described herein or in combination with precast concrete blocks of the type which include a face that abuts against the back face 444 of the block. The block 440 has a significant weight reduction relative to prior known blocks and also has a universal application of usage as described above.

Corner and/or Split Face Blocks

Figure 10:
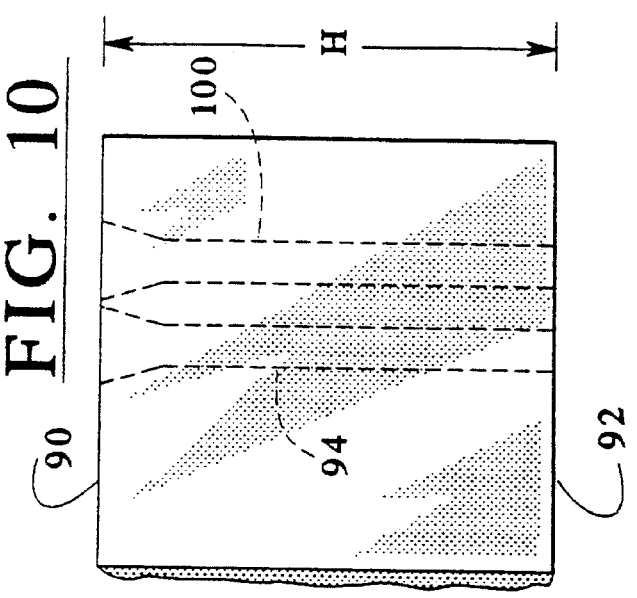
FIG. 10 is a side elevation of the block of FIG. 8.
Figure 8:
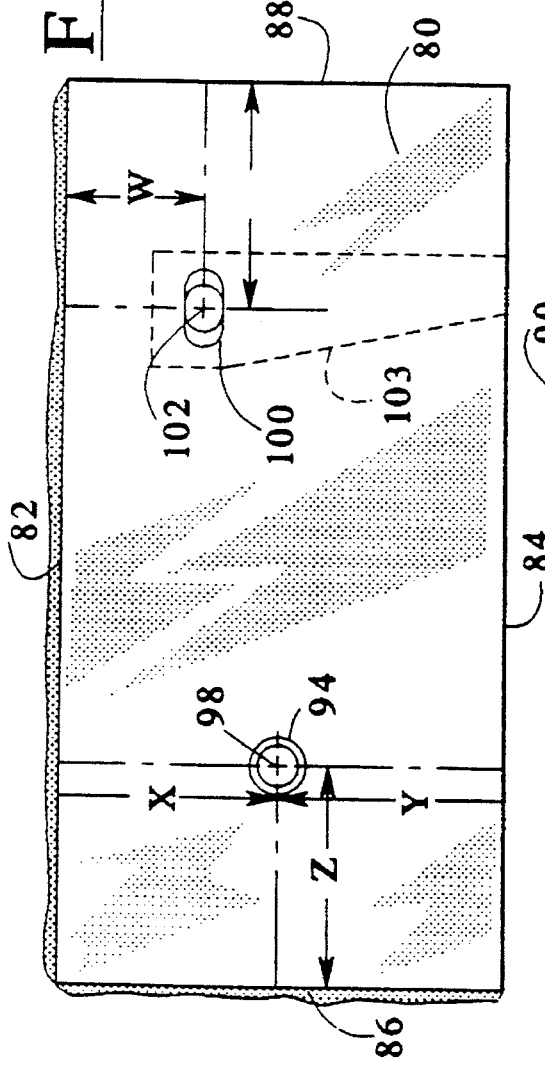
FIG. 8 is a top plan view of a corner block as contrasted from the wall block of FIG. 5.
Figure 9:
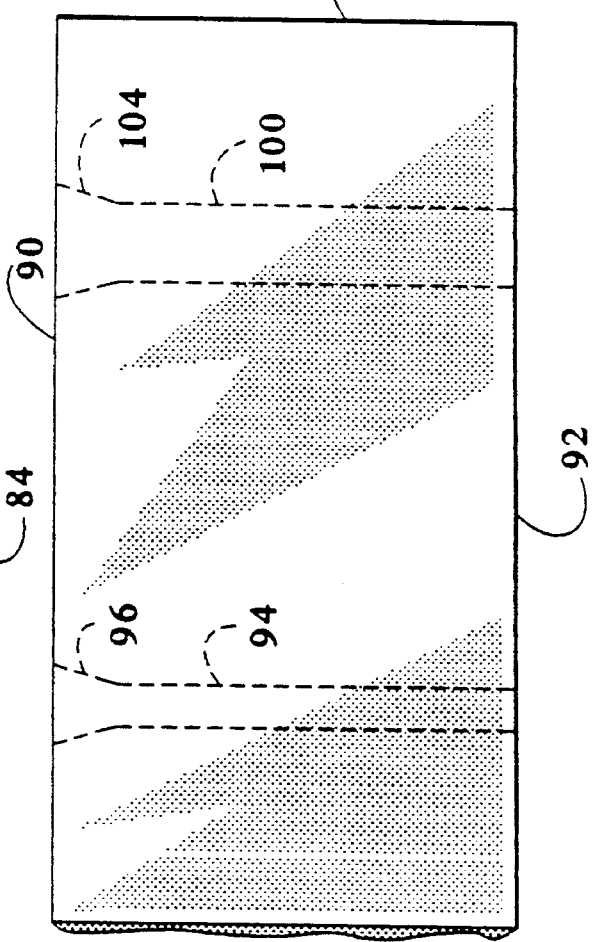
FIG. 9 is a rear elevation of the block of FIG. 8.

FIGS. 8 through 13A depict blocks that are used to form corners of the improved retaining wall construction of the invention or to define a boundary or split face in such a retaining wall. FIGS. 8, 9 and 10 disclose a first corner block 80 which is similar to, but dimensionally different from the corner blocks 110 of FIGS. 11, 12 and 13. Referring, therefore, to FIGS. 8, 9 and 10, corner block 80 comprises a front face 82, a back face 84, a finished side surface 86 and a unfinished side surface 88. A top surface 90 is parallel to a bottom surface 92. The surfaces and faces generally define a rectangular parallel piped. The front face 82 and the finished side surface 86 are generally planar and may be finished with a texture, color, composition and configuration which is compatible with or identical to the surface treatment of blocks 40. The corner block 80 includes a first throughbore 94 which extends from the top surface 90 through the bottom surface 92. The throughbore 94 is generally cylindrical in shape; however, the throughbore 94 may include a funnel shaped or frusto-conical section 96 which facilitates cooperation with a rod, such as rod 46, as will be explained below. The cross sectional area of the throughbore 94 is slightly larger than the cross sectional area and configuration of a compatible rod, such as rod 46, which is designed to fit through the throughbore 94. Importantly, the cross sectional shape of the throughbore 94 and the associated rod, such as rod 46, are generally congruent to preclude any significant alteration and orientation of the corner block 80 once a rod 46 is inserted through a throughbore 94.

The position of the first throughbore 94 relative to the surfaces 82, 84 and 86 is an important factor in the design of the corner block 80. That is, the throughbore 94 includes a centerline axis 98. The axis 98 is substantially an equal distance from each of the surfaces 82, 84 and 86, thus rendering the distances x, y and z in FIG. 8 substantially equal, where x is the distance between the axis 98 and the surface 82, y is the distance between the axis 98 and the surface 84, and z is the distance between the axis 98 and the surface 86.

The corner block 80 further includes a second throughbore 100 which extends from the top surface 90 through the bottom surface 92. The second throughbore 100 may also include a funnel shaped or frusto-conical section 104. The cross sectional shape of the throughbore 100 generally has an elongated or elliptical form and has a generally central axis 102 which is parallel to the surfaces 82, 84, 86 and 98. The longitudinal dimension of the cross sectional configuration of the second throughbore 100 is generally parallel to the front face 82. The axis 102 is specially positioned relative to the side surface 88 and the front face 82. Thus the axis 102 is positioned a distance w from the front face 82 which is substantially equal to the distance w which axis 66 is positioned from front face 50 of the block 40 as depicted in FIG. 5. The axis 102 is also positioned a distance v from the unfinished side surface 88 which is substantially equal to the distance c which the axis 62 is positioned from the edge 53 of the front face 50 of the block 40 as depicted again in FIG. 5. A counterbore 103 may be provided for throughbore 100. Counterbore 103 extends from back surface 84 and around bore 100. The counterbore 103 may be provided in both top and bottom surfaces 90 and 92.

The distance u between the axis 102 and the axis 98 for the corner block 80 is depicted in FIG. 8 and is equal to the distance u between the axis 66 and the axis 68 for the block 40 in FIG. 5. The distance u is substantially to two times the distance v. The distance v between the axis 102 and the side surface 88 is substantially equal to the distance z between the axis 98 and the side surface 86. The correlation of the various ratios of the distances for the various blocks 40, 80 and 110 set forth above is summarized in the following Table No. 1:

TABLE 1

| For Block 40 | $2v = u$ |
|---|---|
| For Corner Block 80 | $x = y = z$ |
| | $x + y = u$ |
| | $v + z = u$ |
| For Corner Block 110 | $a = b = c$ |
| | $d = v + c$ |

It is to be noted that the corner block 80 of FIGS. 8, 9 and 10 is a corner block 80 wherein the perimeter of the front face 82 is dimensionally substantially equal to the front face 50 of the block 40. FIGS. 11, 12 and 13 illustrate an alternative corner block construction wherein the front face and finished side face or surface are different dimensionally from that of the corner block 80 in FIGS. 8, 9 and 10.

Referring therefore to FIGS. 11, 12 and 13, a corner block 110 includes a front face 112, a back face 114, a finished side surface 116, an unfinished side surface 118, top and bottom parallel surfaces 120 and 122. The block 110 has a rectangular, parallel piped configuration like the block 80. The block 110 includes a first throughbore 124, having a shape and configuration substantially identical to that of the first throughbore 94 previously described including the frusto-conical section 126, and an axis 128. Similarly, the block 110 includes a second throughbore 130 having an axis 132 with a cross sectional configuration substantially identical to that of the second throughbore 100 and also including a frusto-conical or funnel shaped section 134. Also counterbores 131 may be provided in the top and bottom surfaces 120, 122. The front face 112 and finished side surface 116 are finished, as previously described with respect to front face 50, in any desired fashion. The front face 112 has a height dimension as illustrated in FIG. 13 as height which is substantially equal to the height of the block 40 in FIG. 7, as well as the height of the block 80 as illustrated in FIG. 10.

The axis 128 is again equally spaced from the face 112, surface 116 and surface 114 as illustrated in FIG. 11. Thus, the distance a from the surface 112 to axis 128 equals the distance b from the face 114 to the axis 128 which also equals the distance c from the surface 116 to the axis 128. The axis 132 is spaced from the front face 112 by the distance w which again is equal to the distance w of spacing of axis 66 from face 50 of block 40 as shown in FIG. 5. Similarly, the axis 132 is spaced a distance v from the unfinished side surface 118 which is equal to the distance c associated with the block 40 as depicted in FIG. 5. The distance between the axis 132 and the axis 128 represented by d in FIG. 11 equals the distance v between axis 132 and surface 118 plus distance c, the distance between axis 128 and finished side surface 116. Again, these dimensional relationships are set forth in Table 1.

Figure 13A:
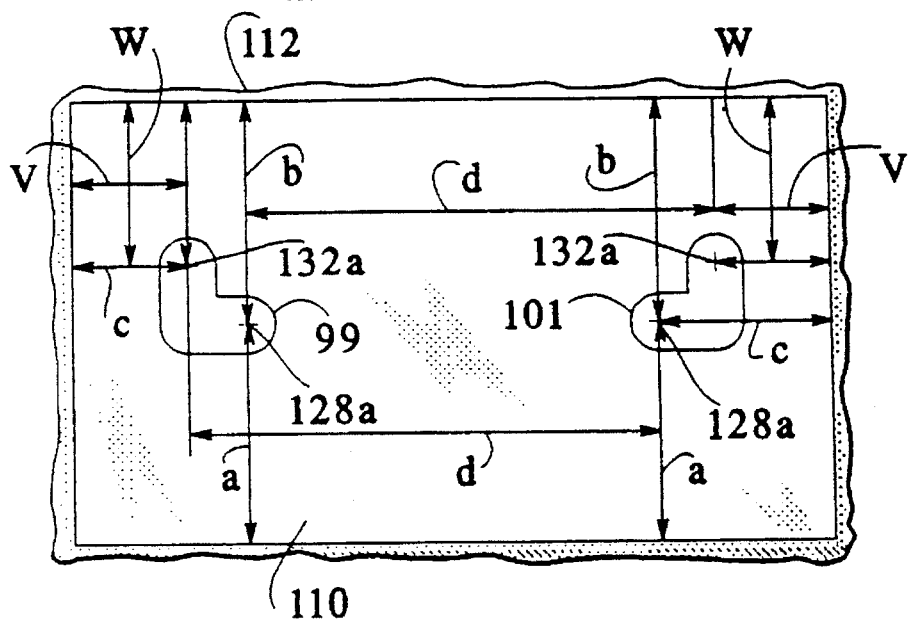
FIG. 13A is a top plan view of an alternate throughbore pattern for a corner block.

FIG. 13A illustrates the configuration of a corner block which is reversible and includes throughbores 99, 101 which are shaped with an L shaped cross section so as to function as though they are a combination of throughbores 124, 130 of the embodiment of FIG. 11. Thus bores 99 and 101 each include an axis 128a which is equivalent to axis 128 of the corner block of FIG. 11 and a second axis 132a which is equivalent to the axis 132 of the block of FIG. 11.

Other alternative block constructions are possible within the scope of the invention and some modifications and alternatives are discussed below. However, the afore-described block 40 as well as the corner blocks 80 and 110 are principal modular blocks to practice the preferred embodiments of the invention.

Stabilizing Elements

The second major component of the retaining wall construction comprises retaining elements which are interactive with and cooperate with the blocks 40, 80, and 110, particularly the basic block 40. FIGS. 14 through 17 illustrate various stabilizing elements. Referring first to FIG. 14, there is illustrated a stabilizing element 42 which is comprised of a first parallel reinforcing bar 140 and a second parallel reinforcing bar 142. The bars 140 and 142 each have a loop 144 and 146 respectively formed at an inner end thereof. Typically, the bars 140 and 142 are deformed to form the loops 144, 146 and the ends of the loops 144, 146 are welded back on to the bar 140 and 142.

Importantly, each loop 144 and 146 is connected to a tension arm 148 and 150 defined by the bars 140 and 142. The tension arms 148 and 150 are parallel to one another and are of such a length so as to extend beyond the back face of any of the blocks previously described. A cross member 152, positioned beyond the back face of the block 40, connects the arms 148 and 150 to ensure their appropriate spacing and alignment. A second cross member 154 ensures that the arms 148 and 150, as well as the bars 140 and 142 remain generally parallel.

There are additional cross members 156 provided along the length of the bars 140 and 142. The spacing of the cross members 156 is preferably generally uniform along the outer ends of the bars 140 and 142. The uniformly spaced cross members 156 are associated with the passive or resistive zone of a mechanically stabilized earth structure as will be described in further detail below. The cross members 156 are thus preferably uniformly spaced one from the other at generally closer intervals in the so called passive or resistive zone. The bars or cross members 154 as well as cross member 152 are not necessarily closely spaced or even required so long as the bars 140 and 142 are maintained in a substantially parallel array.

It is noted that in the preferred embodiment, that just two bars 140 and 142 are required or are provided. However, stabilizing elements having more than two longitudinal members (e.g. bars 140, 142) may be utilized. The stabilizing element depicted and described in FIG. 14 relies upon frictional interaction as well as anchoring interaction with compacted soil. The cross members 156 thus act as a collection of anchors. The bars 140 and 142 provide for frictional interaction with compacted soil.

FIG. 15 illustrates a component of a further alternative stabilizing element 44. Specifically referring to FIG. 15, the element depicted includes a harness or connector 160 which includes a first tension bar or arm 162 and a second bar or arm 164. Arms 162 and 164 are generally parallel to one another and are connected by a cross member 166, which in this case also includes a cylindrical, tubular member 168 retained thereon. Alternatively, as depicted in FIG. 15A, a C shaped clamp member 167 may be fitted over the cross member 166.

Each of the parallel tension arms 162 and 164 terminate with a loop 170 and 172. The loops 170 and 172 are arranged in opposed relationship and aligned with one another as depicted in FIG. 15. The ends of the loops 170 and 172 are welded at weld 174 and 176, respectively to the arms 162 and 164, respectively.

Figure 17:
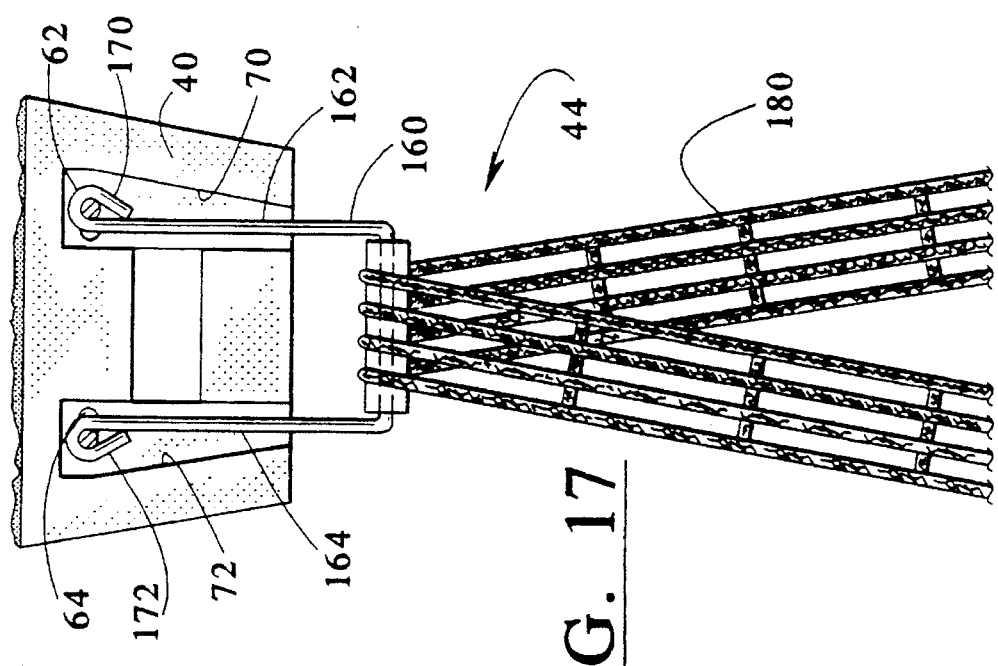
FIG. 17 is a top plan view of the component or element depicted in FIG. 16 in combination with a flexible geotextile material and a block of the type shown in FIG. 2.
Figure 16:
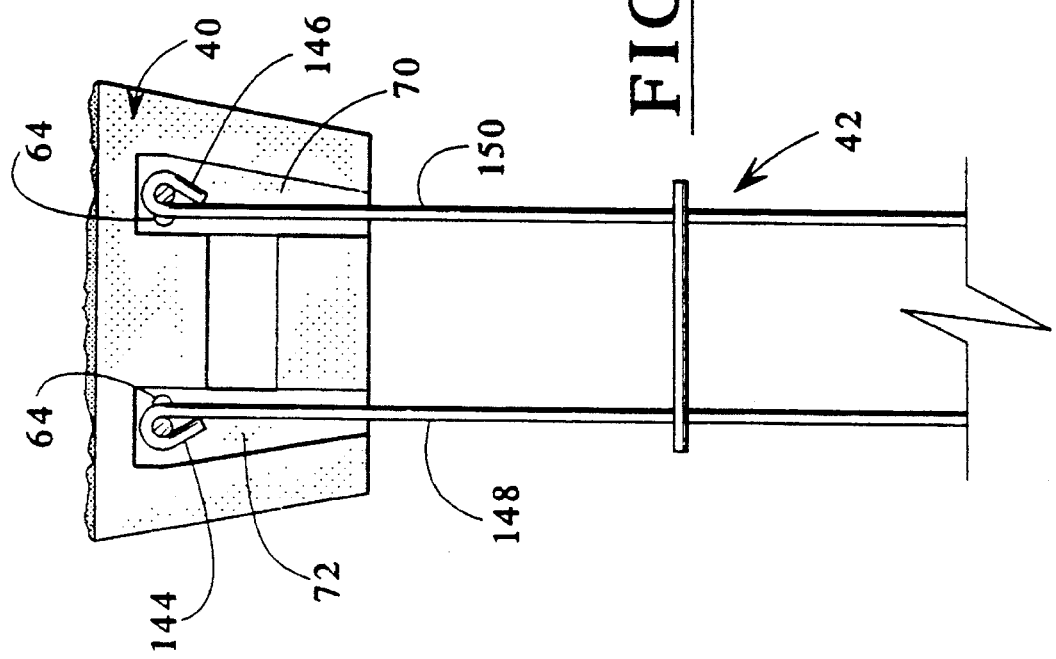
FIG. 16 is a top plan view of the element shown in FIG. 14 in combination with a block of the type shown in FIG. 2.

The harness or connector 160 is cooperative with the blocks, most particularly block 40, as will be described in further detail. That detail is illustrated, in part, in FIGS. 16 and 17. Referring first to FIG. 16, there is depicted a stabilizing element 42. FIG. 17 illustrates the stabilizing element 44. Referring to FIG. 16 the element 42 and more particularly the tension arms 148 and 150 are positioned in the counterbores 70 and 72 of block 40 with the loops 144 and 146 positioned over the throughbores 62 and 64, respectively.

Referring to FIG. 17, the connector 160, which comprises a portion of the stabilizing element 44, includes arms 162 and 164 which are fitted into the counterbores 70 and 72, respectively of block 40 with loops 170 and 172, respectively fitted over the throughbores 62 and 64. Note that connector 160 is sufficiently recessed within the block 40 so as to be below the plane of the top surface 58 thereof. Similarly, the tension arms 148 and 150 of the element 42 are sufficiently recessed within the counterbores 70 and 72 to be below the plane or no higher than the plane of the top surface 58 of the block 40.

Referring again to FIG. 17, the element 44 further includes a geotextile material comprising a lattice of a polymeric strips such as strip 180 which is generally flexible and wherein an elongated length thereof is wrapped around or fitted over the tube or cylinder 168 or clamp 167 so that the opposite ends of the strips 180 extend outwardly and away from the block 40. Thus, FIG. 16 illustrates a generally rigid element. FIG. 17 illustrates a generally flexible element. In each event, the elements 42 and 44 are cooperative with a block 40 as described.

Connectors

Depicted in FIG. 4 is a typical connector which comprises a reinforcing rod or bar normally a steel reinforcing bar 46 which is generally cylindrical in shape and which is fitted through loops, for examples loops 170 and 172 in FIG. 17 and associated throughbores 62 and 64 of block 40 to thereby serve to retain the element 44 and more particularly the connector 160 cooperatively engaged with block 40. The rod 46, which is depicted as the preferred embodiment, is cylindrical as previously mentioned. However, any desired size may be utilized. It is to be noted that the steel reinforcing bars which are recommended in order to practice the invention are also utilized in cooperation with the specially configured first throughbores 94, 124 of the corner blocks 80, 110. For example first throughbore 124 of the corner block 110 illustrated in FIG. 12 cooperates with a rod such as rod 46 illustrated in FIG. 4. The rods 46 are of a sufficient length so that they will project through at least two adjacent blocks 40 which are stacked one on top of the other thus distributing the compressive forces resulting from the elements 44 interacting with the blocks 40 to blocks of adjacent courses forming a wall.

As depicted in FIG. 4& the rod 46 may include a small stop or cross bar 47 welded or attached at its midpoint. Cross bar 47 insures that the rod 46 will be positioned properly and retained in position to engage blocks 40 above and below the block 40 in which rod 46 is positioned to cooperate with elements 42, 44. Thus, the rod 46 will not fall or slip downward into throughbores 62, 64.

Retaining Wall System

FIGS. 18 through 29 illustrate the manner of assembly of the components heretofore described to provide a retaining wall. Referring first to FIG. 18, there is depicted an array of three courses of modular blocks 40 and corner blocks 80 to define a section or portion of a wall using the components of the invention. Note that each of the courses provide that the blocks 40 are overlapping. Note further that the front face dimensions of the corner block 80 are equal to the front face dimensions of the modular blocks 40. The side face or surface dimensions of the corner blocks 80 are equal to one half of the dimensions of the basic blocks 40.

FIG. 19, which is a sectional view of the wall of FIG. 18, illustrates the manner of positioning the corner blocks 80 and modular basic building blocks 40 with respect to each other to define the first course of the wall depicted in FIG. 18. Note that elements 42, which are the rigid stabilizing elements, are cooperatively positioned for interaction with the blocks 40. In the preferred embodiment, stabilizing elements 42 are provided for use in association with each and every one of the modular blocks 40 and the elements 42 include only two parallel reinforcing bars. It is possible to provide for construction which would have a multiple number of reinforcing bars or special anchoring elements attached to the bars. The preferred embodiment is to use just two bars in order to conserve with respect to cost and further, the two bar construction provides for efficient distribution of tensile forces and anchoring forces on the element 42 and torsional forces, are significantly reduced.

FIG. 20 illustrates the manner in which the corner block 80 may be positioned in order to define an edge or corner of the wall depicted in FIG. 18. Thus, the block 80, which is a very symmetrical block as previously described, may be alternated between positions shown in FIGS. 19 and 20. Moreover, the corner blocks 80 may be farther oriented as depicted and described with respect to FIGS. 27 through 29 below. The element 44, which is a stabilizing element utilizing a flexible polymeric or geotextile material, is depicted as being used with respect to the course or layer of blocks 40 defining or depicted in FIG. 20.

FIG. 21 is a side sectional view of the wall construction of FIG. 18. It is to be noted that the wall is designed so that the cross elements 156 are retained in the so-called resistive zone associated with such mechanically stabilized earth structures. As known to those of ordinary skill in the art, construction of such walls and the analysis thereof calls for the defining of a resistive zone 190 and an active zone 192. The elements 42 are designed so that the cross members 156 are preferably more numerous in the resistive zone thus improving the efficiency of the anchoring features associated with the elements 42. FIG. 21 illustrates also the use of the polymeric grid material 180. It is to be noted that all of the elements 42 and/or 44 are retained in a compacted soil or compacted earth in a manner described in the previously referenced prior art patents. References is made to the American Association of State Highway and Transportation Officials "Standard Specification for Highway Bridges", Fourteenth Edition as amended (1990, 1991) and incorporated herewith by reference, for an explanation of design calculation procedures applicable for such constructions.

In FIG. 21 there is illustrated the placement of a stabilizing element, such as elements 42 or 44, in association with each and every course of blocks 40, 80. In actual practice, however, the stabilizing elements 42 and/or 44 may be utilized in association with every second, third or fourth course of blocks 40, 80 or at every second or third block horizontally in accord with good design principles. This does not, however, preclude utilization of the stabilizing elements 42, 44 in association with each and every course and each and every block 40, 80. It has been found, however, that the mechanically stabilized earth re-embankment does not require such numerous stabilizing elements. Again, calculations with respect to this can be provided using techniques known to those of ordinary skill in the art such as referenced herein.

During construction, a course of, blocks 40 are initially positioned in a line on a desired footing 200, which may consist of granular fill, earthen fill, concrete or other leveling material. Earthen backfill material 202 is then placed behind the blocks 40. An element such as stabilizing element 42 may then be positioned in the special counterbores 70, 72 in a manner previously described and defined in the blocks 40, 80. Rods 46 may then be inserted to maintain the elements 42 in position with respect to the blocks 40. The rods 46 should, as previously described, interact with at least two adjacent course of blocks 40. A layer of sealant, fabric or other material (not shown) may be placed on the blocks. Subsequently, a further layer of blocks 40 is positioned onto the rods 46. Additional soil or backfill 202 is placed behind the blocks 40, and the process continues as the wall is erected.

In practice, it has been found preferable to orient the counterbores 70, 72 facing downward rather than upward during construction. This orientation facilitates keeping the counterbores 70, 72 free of debris, etc. during construction.

FIGS. 22 and 23 illustrate side elevations of the construction utilizing a flexible stabilizing element 44 in FIG. 22 and a rigid stabilizing element 42 in FIG. 23. In each instance, the elements 42 and/or 44 are cooperative with blocks 40, rods 46 and compacted soil 202 as previously described.

Referring next to FIGS. 24 and 25, as previously noted the throughbores 62, 64 in the blocks 40 have an elongated cross sectional configuration. Such elongation permits a slight adjustable movement of the blocks 40 laterally with respect to each other to ensure that any tolerances associated with the manufacture of the blocks 40 are accommodated. It was further noted that the blocks 40 are defined to include converging side surfaces 54, 56. Because the side surfaces 54, 56 are converging, it is possible to form a wall having an outside curve as depicted in FIG. 24 or an inside curve as depicted in FIG. 25. In each instance, the mode of assembly and the cooperative interaction of the stabilizing elements 42, 44 and rods 46 as well as blocks 40 are substantially as previously described with respect to a wall having a flat front surface.

Figure 26:
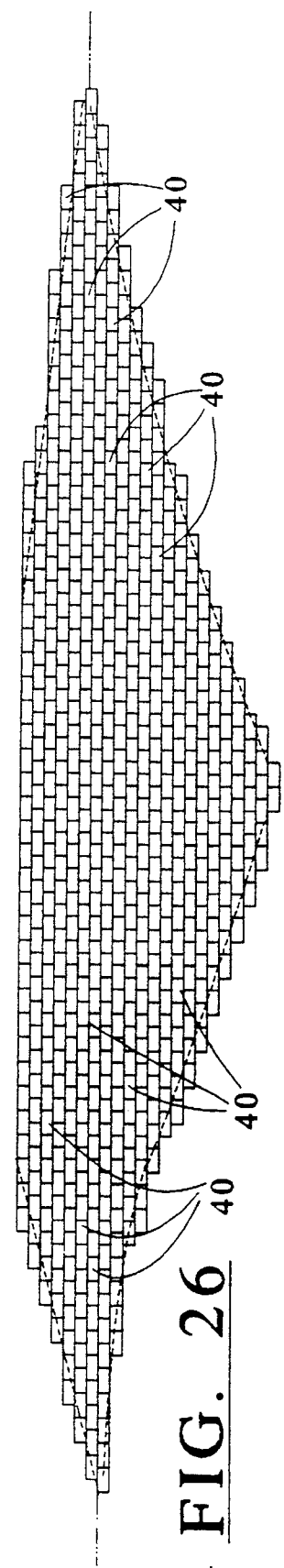
FIG. 26 is a front elevation depicting a typical retaining wall in accord with the invention.

FIG. 26 illustrates the versatility of the construction of the present invention. Walls of various shapes and dimensions and height may be constructed. It is to be noted that with the combination of the present invention the front face of the wall may be substantially planar and may rise substantially vertically from a footing. Though it is possible to set back the wall or tilt the wall as it descends, that requirement is not necessary with the retaining wall system of the present invention. Also, the footing may be tiered. Also, the block 40 may be dry cast and are useful with rigid stabilizing element such as elements 42, as contrasted with geotextile materials.

Figure 28:
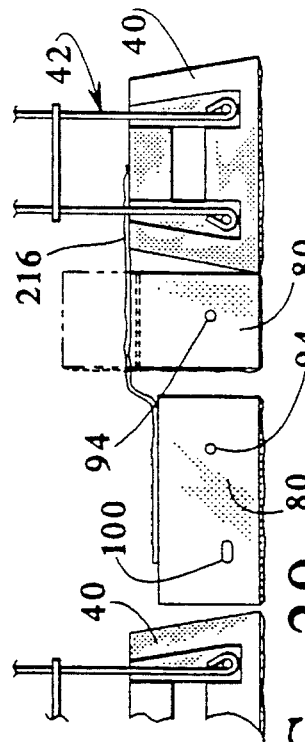
FIG. 28 is a sectional view of the wall shown in FIG. 27 taken substantially along the lines 28—28.
Figure 29:
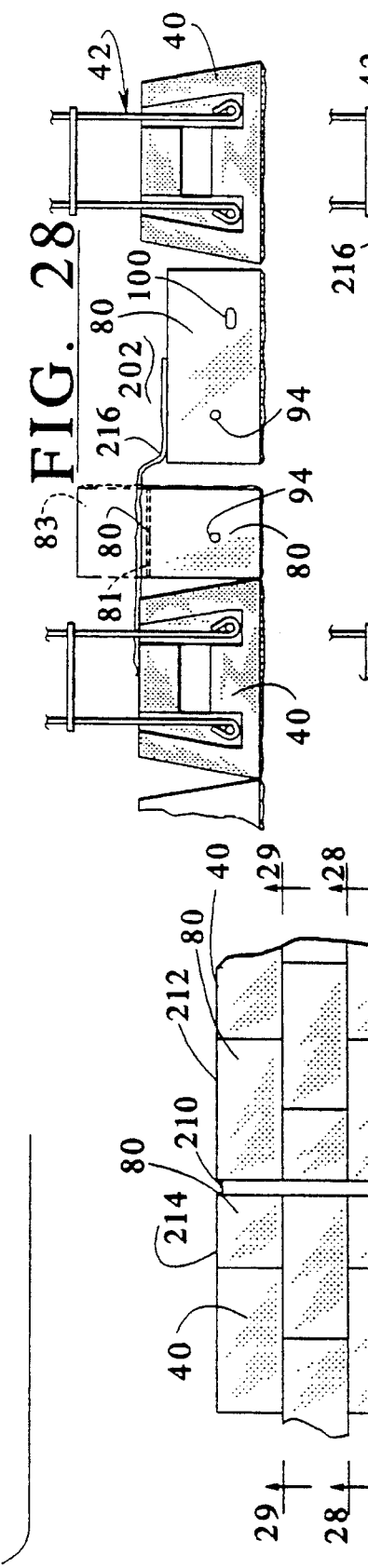
FIG. 29 is a section view of the wall of FIG. 27 taken substantially along the line 29—29.
Figure 27:
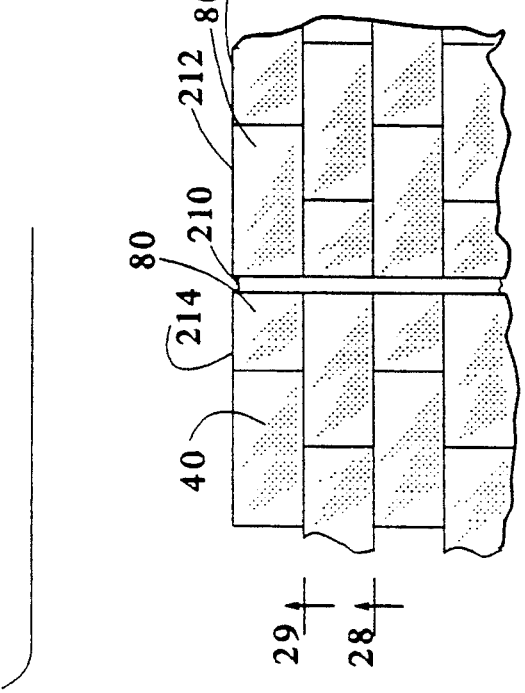
FIG. 27 is an enlarged front elevation of a retaining wall illustrating the manner in which a split-face may be constructed utilizing the invention.

FIGS. 27, 28 and 29 illustrate the utilization of corner blocks to provide for a split in a conventional wall of the type depicted in FIG. 26. As shown in FIG. 27, a split or vertical slot 210 is defined between wall sections 212 and 214. Sectional views of the walls 212 and 214 are depicted in FIGS. 28 and 29. There it will be seen that the corner blocks 80 which may be turned in either a right handed or left handed direction may be spaced from one another or positioned as closely adjacent as desired or required. A fabric or other flexible material 216 may be positioned along the back side of the blocks 80 and then backfill 202 positioned against the flexible material 216.

FIG. 29 illustrates the arrangement of these elements including the flexible barrier 216 and the blocks 80 for the next course of materials. It is to be noted that the first throughbore 94 of the corner blocks 80 as well as for the corner block 110 always align vertically over one another as each of the courses are laid. Thus a rod 46 may be passed directly through the first throughbores 94 to form a rigidly held corner which does not include the capacity for adjustment which is built into the throughbores 62, 64 associated with the blocks 40 or the second throughbore 100 associated with corner blocks 80. The positioning of the throughbores 94 facilitates the described assembly. The blocks 80 may include a molded split line 81 during manufacture. The line 81 facilitates fracture of the block 80 and removal of the inside half 83 or shown in FIG. 28.

The stabilizing elements 42, 44, may also be cooperative with the counterbores 103, 131 of the corner blocks 80, 110. In practice such construction is suggested to stabilize corners of a wall. The elements 42, 44 would thus simultaneously cooperate with counterbores 103, 131 of a corner block 80, 110 and counterbores 70 or 72 of a modular block 40.

Alternative Constructions

FIGS. 30 through 35 depict an alternative facing block construction which may be used in combination with various types of stabilizing elements including soil reinforcing elements as well as anchor elements or anchor blocks. FIGS. 30, 31 and 32 depict the facing block construction in combination with other precast blocks. FIGS. 33, 34 and 35 depict the facing block construction itself. Thus, referring initially to FIGS. 33, 34 and 35, a facing block 440 includes a planar front face 441 defined by spaced generally parallel side edges 442 and 443. In the embodiment depicted, the side edges include a chamfer. The front face 441 is connected to a back face 444 by converging side faces 445 and 446. The angle of convergence of the side faces 445 and 446 is preferably in the range of 5 to approximately 20 degrees. Parallel top surface 447 and bottom surface 448 intersect the other faces of the block. The described faces define the outer shell or outer extent of the facing block 440. The block 440 includes first and second parallel vertical throughbores 448 and 449 which comprise rod receiving throughbores. The rod receiving throughbores 448 and 449 have a profile in cross section and are dimensionally positioned within the block 440 in substantially the same manner substantially as previously described with respect to the facing block 40. In fact, the block 440 is substantially identical to the facing block 40 except for the configuration and positioning of the hollow cross throughbore 450 and the additional channel 451 from the throughbore 450 through the back face 444 which are described in greater detail below. In any event, the vertical rod receiving throughbore 448 has a counterbore 452 associated therewith. The counterbore 452 effectively surrounds the throughbore 448 as it is cut into the top surface 447. The counterbore 452 thus extends from the region surrounding the throughbore 448 and defines a channel through the back face 444. The counterbore 452 thus defines channel side walls 453, 454 and 455. The walls 453 are opposed to the walls 454 and 455. The walls 454 and 455 define a straight line from the front face 441 to the back face 444. The channel walls 453, 454 and 455 thus define the recess within the top surface 447. A mirror image channel 456 is defined in the top surface 447 in association with the throughbore 449. The cross throughbore 450 has a generally cruciform profile as depicted in FIG. 34. The cross throughbore 450 thus connects the counterbore 452 with the counterbore 456. Note, however, the cruciform shape of the cross throughbore 450 ensures that walls associated with the channel such as walls 453, 454 and 455 are provided to facilitate alignment of tension members or other members positioned within the counterbores 452 and 456. A separate additional channel extends from the throughbore 450 through the back face 444. The channel 45 1 has a depth which may be less than the depth of the counterbores 452 and 456 as depicted in FIG. 35.

Providing the specially constructed cruciform profile cross counterbore 450 enables significant weight reduction of the block 440. It also provides a hollow passage through the block 440 which may be connected by means of some connector to be described below with hollow concrete blocks also to be described below with respect to FIGS. 30–32. The facing block 440 depicted in FIGS. 33 through 35 may be used as a substitute for the facing block 40 previously described with respect to FIG. 1, for example. As previously mentioned, the additional construction of the cruciform shaped hollow cross throughbore 450 as well as a channel 451 distinguish the facing block 440 from the block 40 and thus facing block 440 comprises a variation of the construction previously described. This variation may be used in the manner previously described to coact with stabilizing elements of the type depicted in FIG. 1 and FIG. 3. It may also coact with vertical rods such as rods 46 for connecting overlying courses of facing blocks. Importantly, however, the facing block 440 may also be used in the manner depicted in FIGS. 30, 31 and 32 in combination with precast anchor blocks 434 connected to the facing block 440 by means of a connector member 436 which fits through the channel 45 1 to connect the hollow cross throughbore 450 with a hollow 435 defined in the anchor blocks 434. Thus, courses of facing blocks 440 in combination with anchor blocks 434 also connected by means of connecting members 436 may be provided to construct a wall. The blocks 434 act as anchor blocks or stabilizing elements in conjunction with the facing blocks 440 as depicted in FIGS. 30, 31 and 32. Compacted soil 438 may thus be utilized in combination with the blocks 434, connecting elements 436 and facing elements or blocks 440. The facing block 440 may also be connected by means of vertical rods 437 which coact with throughbores such as throughbores 448 and 449 as depicted in FIG. 32.

FIG. 31 depicts a further feature which may be incorporated in the blocks 440. As depicted in that figure, the blocks 440 may include one further set of counterbores or channels namely, channels 433 and 439 which extend from the hollow cross throughbore 450 through the side faces 445 and 446 respectively. These channels 433 and 439 may be of sufficient depth and configuration so that a longitudinal rod 43 1 may be positioned through the channels 433 and 439 and also extending through the cross throughbore 450 to thereby horizontally connect the blocks 440. Again, this is a modification of the block 440 which, not only reduces its weight, but provides another option with respect to interconnection of such blocks 440 in the configuration or construction of a retaining wall.

The described components and the mode of assembly of those components constitute preferred embodiments of the invention. It is to be noted that the corner blocks 80 as well as the standard modular blocks 40 may be combined in a retaining wall having various types of stabilizing elements and utilizing various types of analysis in calculating the bill of materials. That is, the stabilizing elements have both anchoring capabilities as well as frictional interactive capability with compacted soil or the like. Thus, there is a great variety of stabilizing elements beyond those specifically described which are useful in combination with the invention.

For example, the stabilizing elements may comprise a mat of reinforcing bars comprised of two or more parallel bars which are designed to extend into compacted soil. Rather than forming the loops on the ends of those bars to interact with vertical rods 46, it is possible to merely bend the ends of such rods at a right angle so that they will fit into the throughbores 62, 64 through the blocks 40 thereby holding mats or reinforcing bars in position. Additionally, the rods 46 may be directly welded to longitudinal tensile arms in the throughbores thus eliminating the necessity of forming a loop in the ends of the tension arms.

Though two tensions arms and thus two reinforcing bars are the preferred embodiment, a multiplicity of tension arms may be utilized. Additionally as pointed out in the description above, the relative size of the corner blocks may be varied and the dimensional alternatives in that regard were described. The shapes of the rods 46 may be varied. The attachment to the rods 46 may be varied.

Also, cap blocks 250 may be provided as illustrated in FIG. 36 and 36A. Such blocks 250 could have a plan profile like that of modular blocks 40 but longer lateral dimension and would include four throughbores 252, which could be aligned in pairs with throughbores 62, 64. The cap blocks 250 may then be alternated in orientation as depicted in FIG. 36A with rods 46 fitting in proper paris of openings 252. Mortar in openings 252 would lock the cap blocks 250 in place. Cap blocks 250 could also be split into halves 254, 256 as shown in FIG. 36A to form a corner. An alternative cap block construction comprises a rectangular shaped cap with a longitudinal slot on the underside for receipt of the ends of rods 46 projecting from the top course of a row of blocks 40. Other constructions are also possible.

Another alternative construction for a stabilizing element is illustrated in FIG. 37. There tension arms 260, 262 and cross members 264 cooperate with a clamp 266 which receives a bolt 268 to retain a metal strip 270. Strip 270 is designed to act as a friction strip or connect to an anchor (not shown).

FIG. 38 depicts another alternative construction for a stabilizing element 280 and the connection thereof to block 40. Element 280 includes parallel tension arms 281, 283 with a cross member 282 which fits in the space between counterbores 70, 72 defined by passage 74. The shape of the walls defining the passage 74 may thus be molded to maximize the efficient interaction of the stabilizing element 280 and block 40.

FIG. 39 depicts yet another alternative construction wherein block 40 includes a passage 290 from internal passage 74 through the back face 52 of block 40. A stabilizing element such as a strip 292 fits through passage 290 and is retained by a pin 294 through an opening in strip 292. Strip 292 may be tied to an anchor (not shown) or may be a friction strip. Rods 46 still are utilized to join blocks 40.

Figure 40:
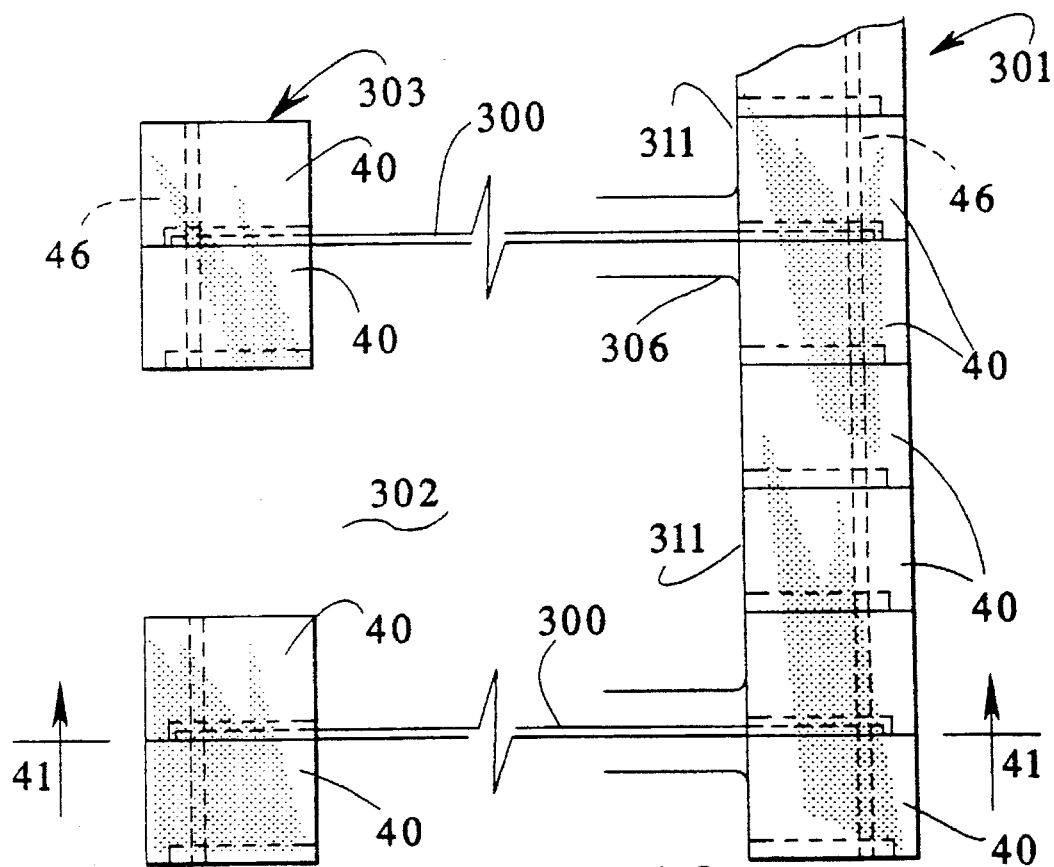
FIG. 40 is a side elevation of an alternative wall construction utilizing anchor type stabilizing elements.

FIGS. 40 and 41 depict a wall construction comprised of blocks 40 in combination with blocks 40 serving as anchor type stabilizing elements. The anchor type stabilizing elements are connected by double ended tensile elements 300 analogous to elements 42 previously described. The anchor block elements 40 and facing blocks 40 are each connected by means of vertical rods 46. The facing blocks 40 form on outer wall 301 and an inner anchor 303 connected by tensile elements 300. Anchors 303 are imbedded in compacted soil 302. The inside surface of the outer wall 301 may be lined with a fabric liner 311 to prevent soil erosion. This design for a wall construction utilizes the basic components previously described and may have certain advantages especially for low wall constructions.

FIGS. 42, 43 and 44 illustrate further alternative constructions for a stabilizing element 3 12 and a connection thereof to block 40. Reference is also directed to FIG. 38 which is related functionally to FIGS. 42, 43, and 44. Referring to FIG. 42, there is depicted a block 40 with a stabilizing element 3 12 comprised of first and second parallel arms 304 and 305 which are formed from a continuous reinforcing bar to thereby define an end loop 306 which fits over a formed rib 308 defined between the connected counterbores 70 and 72. This is analogous to the construction depicted in FIG. 38. The parallel arms or bars 304 and 305 are connected one to the other by cross members 307 and 309 which are connected to the arms 304 and 305 at an angle to thereby define a truss type construction. The ends of the arms 304 and 305 may be connected by a transverse, perpendicular cross member or cross brace 310.

Referring to FIG. 43 there is illustrated yet another alternative construction wherein a stabilizing element 313 is again comprised of parallel arms 314 and 316 which form a symmetrical closed loop construction including an end 3 18 having a generally v shape as depicted in FIG. 43 cooperative with a rib 320 defined in the block 40. Note that the cross members 322 are at an angle to define a truss type configuration. Further note that the v-shaped end 318 includes an opposite end counterpart 328 so that the entire stabilizing element 3 12 is generally symmetrical.

FIG. 44 illustrates a variation on the theme of FIG. 43 wherein a stabilizing element 324 is comprised of arms 326 and 328 which cooperate with reinforcing bars 46 positioned in block 40 in the manner previously described. Crossing members 327 are again configured to define a generally truss shaped pattern analogous to the construction shown in FIGS. 42 and 43. Thus it can be seen that the construction of the stabilizing element may be varied significantly while still providing a rather rigid stabilizing element cooperative with blocks 40 and corner blocks as previously described.

FIGS. 45 and 46 illustrate an alternative to the cap block construction previously described. In FIG. 45 the bottom plan view of the cap block has substantially the same configuration as a body block. Thus cap block 340 includes counterbores 70 and 72 which are designed to be cooperative with stabilizing elements in the manner previously described. The passageways through the cap block 340, however, do not pass entirely through the block. Thus, as illustrated in FIG. 46, the cap block 340 includes counterbores 72 and 70 as previously described. A passageway for the reinforcing bars 46; namely, passage 342 and 344 extends only partially through the block 340. Similarly the passage 346 extends only partially through the cap block 340. In this manner, the cap block 340 will define a cap that does not have any openings at the top thereof. The cap block 340 as depicted in FIGS. 45 and 46 may, when in a position on the top of the wall, have gaps between the sides of the blocks because of their tapered shape. Thus it may be appropriate and desirable to mold or cast the cap blocks in a rectangular, parallel piped configuration as illustrated in dotted lines in FIG. 45. Alternatively, the space between the blocks 340 forming the cap may be filled with mortar.

The invention, therefore, has many variations and is only to be limited by the following claims and equivalents.

What is claimed is:

1. An improved retaining wall construction comprising, in combination:

a plurality of facing block members arrayed in overlapping courses one upon the other, each block member having a generally planar front face, a back face, opposite side faces connecting the front face to the back face, and generally parallel top and bottom surfaces;

each block member also including at least two generally parallel rod receiving throughbores extending from the top surface through the bottom surface, each throughbore including a counterbore in one of the parallel top and bottom surfaces, surrounding the throughbore and extending from adjacent the front face through the back face to define a channel with side walls in the block, and a cross throughbore connecting the parallel counterbores;

a stabilizing element comprising a pair of tension arms in the parallel counterbores of selected block members, each pair of said tension arms of each stabilizing element being generally parallel;

the stabilizing elements including soil engaging means extending therefrom projecting away from the back face of each block into compacted soil; and compacted soil adjacent the back face engaging the stabilizing elements.

2. The retaining wall construction of claim 1 wherein each of the block members is substantially identical and the block members of adjacent courses are offset laterally with respect to each other.

3. The retaining wall construction of claim 1 wherein pairs of tension arms are connected together by cross members in the compacted soil.

4. The retaining wall construction of claim 1 including rods in the rod receiving throughbores of vertically adjacent blocks.

5. The retaining wall construction of claim 1 wherein the block members of vertically adjacent courses include front faces which are generally vertically aligned.

6. The retaining wall construction of claim 1 wherein the stabilizing elements comprise an elongated generally rigid, friction member extending from the back face into compacted soil.

7. The retaining wall construction of claim 1 wherein the rod receiving throughbores are elongated slots generally parallel to the front face of the block member.

8. The retaining wall construction of claim 1 wherein the rod receiving throughbores each define a centerline axis which is approximately one quarter of the distance from a side edge of the front face of the block member.

9. The retaining wall construction of claim 1 wherein the tension arms of a stabilizing element in a block member are joined by a cross member adjacent the back face and further including a band looped over the cross member which extends into the compacted soil.

10. The retaining wall construction of claim 1 wherein the cross members are positioned in compacted soil behind the back face of the block members, said soil defines an active zone and a resistive zone in combination with the soil engaging members.

11. The retaining wall construction of claim 10 including cross members in the resistive zone.

12. The retaining wall construction of claim 10 including uniformly spaced cross members in the resistive zone.

13. A retaining wall constructions of claim 1 wherein the soil engaging means are rigid metal tensile members.

14. The retaining wall construction of claim 1 wherein the soil engaging means comprise two parallel rigid metal tensile bars and said soil comprises a resistive zone, said tensile bars projecting into the resistive zone with generally equal tensile forces on each bar.

15. The retaining wall construction of claim 1 wherein the stabilizing elements comprise at least in part a flexible polymeric material.

16. The retaining wall construction of claim 1 wherein the block includes fiber reinforcement material.

17. The retaining wall construction of claim 1 wherein the stabilizing elements include a rigid metal strip.

18. The retaining wall construction of claim 1 wherein the stabilizing elements include an anchoring member with said tensile members connected to said anchoring members.

19. The retaining wall construction of claim 1 wherein the facing block is dry cast and is assembled in combination with rigid, metallic stabilizing elements.

20. The retaining wall construction of claim 1 wherein stabilizing elements comprise first and second spaced tensile members extending into the compacted soil as the soil engaging means, and further including cross members connecting the tensile members.

21. The retaining wall construction of claim 20 wherein at least some of the cross members are at substantially right angles to the tensile members.

22. The retaining wall construction of claim 20 wherein at least some of the cross members form a truss construction in combination with the tensile members.

23. The retaining wall construction of claim 1 wherein facing block member cross throughbore is connected with the back face by a channel cut through the retaining wall between the cross throughbore and back face.

24. An improved block member for construction of a retaining wall structure comprising in combination, a cast member having a front face defining parallel side edges, a top edge and a bottom edge connecting the side edges, said cast member also having a back face, side walls extending from the front face and connected with the back face;

a top surface and a generally parallel bottom surface;

first and second parallel rod receiving throughbores from the top surface through the bottom surface, said rod receiving throughbores generally parallel to the side edges, each of said rod receiving throughbores having a centerline axis, each of said rod receiving throughbores defining a profile for receipt of a straight rod therethrough;

a counterbore surrounding each throughbore in at least one of the top or bottom surfaces, each counterbore further defining a channel in said top or bottom surface extending through the back face, said channel defining channel sidewalls;

a cross throughbore in the block extending from the top surface through the bottom surface of the block, said cross throughbore also connecting the channels; and an additional channel from the cross throughbore through the back face of the block.

25. The block of claim 24 wherein the counterbores are in the bottom surface, and wherein the top and bottom surfaces are flat planar surfaces.

26. The block of claim 24 wherein the cross throughbore has a cruciform profile in the plane of the top surface or bottom surface.

27. The block of claim 24 wherein the centerline axis of one rod receiving throughbore is spaced from the centerline axis of the other rod receiving throughbore by approximately one-half the distance between the spaced side edges of the block.

28. The block of claim 24 wherein the side walls converge in the range of 7 to 15 degrees from the front face to the back face.

29. The block of claim 24 wherein the front face of the block is generally flat.

30. The block of claim 24 in combination with a second block having a planar face opposed with the back face, said second block having a hollow core, said block and said second block connected by a connecting member extending from the cross throughbore through the additional channel into the hollow core.

* * * * *